(12) United States Patent
Dou et al.

(10) Patent No.: US 12,738,486 B2
(45) Date of Patent: Sep. 15, 2026

(54) POSITIVE ELECTRODE ACTIVE MATERIAL AND PREPARATION METHOD THEREOF, POSITIVE ELECTRODE PLATE, LITHIUM-ION SECONDARY BATTERY, AND BATTERY MODULE, BATTERY PACK, AND APPARATUS CONTAINING SUCH LITHIUM-ION SECONDARY BATTERY

(71) Applicant: CONTEMPORARY AMPEREX TECHNOLOGY (HONG KONG) LIMITED, Hong Kong (CN)

(72) Inventors: Shushi Dou, Ningde (CN); Chunhua Hu, Ningde (CN); Yao Jiang, Ningde (CN); Qi Wu, Ningde (CN); Jinhua He, Ningde (CN); Bin Deng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 622 days.

(21) Appl. No.: 17/680,588

(22) Filed: Feb. 25, 2022

(65) Prior Publication Data

US 2022/0407059 A1 Dec. 22, 2022

Related U.S. Application Data

(63) Continuation of application No. PCT/CN2020/109855, filed on Aug. 18, 2020.

(30) Foreign Application Priority Data

Sep. 2, 2019 (CN) ......................... 201910825110.4

(51) Int. Cl.
*H01M 4/525* (2010.01)
*H01M 4/36* (2006.01)
(Continued)

(52) U.S. Cl.
CPC .......... *H01M 4/525* (2013.01); *H01M 4/366* (2013.01); *H01M 4/505* (2013.01);
(Continued)

(58) Field of Classification Search
CPC ...... H01M 4/525; H01M 4/366; H01M 4/505; H01M 10/0525
See application file for complete search history.

(56) References Cited

U.S. PATENT DOCUMENTS 9,537,148 B2 1/2017 Kaseda et al.
2017/0324091 A1 11/2017 Hasegawa et al.
(Continued)

FOREIGN PATENT DOCUMENTS

CN 102119128 A 7/2011
CN 102569775 A 7/2012
(Continued)

OTHER PUBLICATIONS

ISR for International Application PCT/CN2020/109855 mailed Nov. 20, 2020.
(Continued)

*Primary Examiner* — Jonathan G Jelsma
(74) *Attorney, Agent, or Firm* — K&L Gates LLP

(57) ABSTRACT

This application discloses a positive electrode active material and a preparation method thereof, a positive electrode plate, a lithium-ion secondary battery, and a battery module, battery pack, and apparatus containing such lithium-ion secondary battery. The positive electrode active material includes bulk particles and an element $M^1$-containing oxide coating layer applied on an exterior surface of each of the bulk particles. The bulk particle includes a nickel-containing lithium composite oxide. Bulk phases of the bulk particles are uniformly doped with element $M^2$. A surface layer of the bulk particle is an exterior doped layer doped with element
(Continued)

$M^3$. Element $M^1$ and element $M^3$ are each independently selected from one or more of Mg, Al, Ca, Ce, Ti, Zr, Zn, Y, and B, and element $M^2$ includes one or more of Si, Ti, Cr, Mo, V, Ge, Se, Zr, Nb, Ru, Rh, Pd, Sb, Te, Ce, and W.

11 Claims, 4 Drawing Sheets

(51) Int. Cl.
*H01M 4/505* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01); *H01M 2220/20* (2013.01)

(56) References Cited

U.S. PATENT DOCUMENTS

2018/0233739 A1* 8/2018 Park ....................... C01G 53/50
2019/0013518 A1 1/2019 Croy et al.
2019/0341598 A1* 11/2019 Nam ..................... H01M 4/134
2020/0020941 A1 1/2020 Mizawa et al.
2020/0028169 A1* 1/2020 Wu ................... H01M 10/0587
2020/0083524 A1* 3/2020 Baek ...................... C01G 53/50

FOREIGN PATENT DOCUMENTS

CN 102683667 A 9/2012
CN 103500827 A 1/2014
CN 104282903 A 1/2015
CN 104409700 A 3/2015
CN 106711414 A 5/2017
CN 107403913 A 11/2017
CN 107994226 A 5/2018
CN 108028373 A 5/2018
CN 108123109 A 6/2018
CN 108123114 A 6/2018
CN 104409700 B 7/2018
CN 108847477 A 11/2018
CN 109817906 A 5/2019
CN 110176579 A 8/2019
CN 110729458 A 1/2020
CN 112447950 A 3/2021
EP 3597604 A1 1/2020
JP 2010129471 A 6/2010
JP 2015201431 A 11/2015
KR 101409837 B1 6/2014
WO 2017143329 A1 8/2017
WO 2018095052 A1 5/2018
WO 2018179936 A1 2/2020

OTHER PUBLICATIONS

Written Opinion for International Application PCT/CN2020/109855 mailed Nov. 20, 2020.
Chinese Office Action for counterpart application 201910825110.4 mailed Jul. 20, 2021.
First Office Action of CN application No. 202211213785.1, dated Jul. 5, 2024.
Notice of Reexamination of CN Application No. 201910825110.4, Jun. 1, 2022.
Second Office Action of CN Application No. 201910825110.4, Oct. 12, 2021.
Reexamation Decision of CN Application No. 201910825110.4, Jul. 7, 2022.
Rejection Decision of CN Application No. 201910825110.4, Jan. 12, 2022.
Extended European Search Report of EP Application No. 20860344.9, Oct. 20, 2022.
Shuai Liu et al., Surface Doping to Enhance Structural Integrity and Performance of Li-Rich Layered Oxide, 33 pages.
F. Schipper et al. "From Surface ZrO2 Coating to Bulk Zr Doping by High Temperature Annealing of Nickel-Rich Lithiated Oxides and Their Enhanced Electrochemical Performance in Lithium Ion Batteries" Advanced Energy Materials, 2018, 8, 1710682, 10 pages.
J Choi et al. "The role of Zr doping in Li(Ni0.6Co0.2Mn0.2)O2 as a stable cathode material for lithium ion batteries" ChemSusChem 10.1002/cssc, 201900500, 10 pages.
Communication of a notice of opposition, EP application No. 20860344.9, dated Apr. 10, 2025.
Notice of Reexamination (with English Machine Translation), mailed Jun. 1, 2022, for corresponding Chinese Patent Application Serial No. 201910825110.4.
Schipper et al., "From Surface ZrO2 Coating to Bulk Zr Doping by High Temperature Annealing of Nickel-Rich Lithiated Oxides and Their Enhanced Electrochemical Performance in Lithium Ion Batteries", Adv. Energy Mater., vol. 8, Issue 4, Feb. 5, 2018, (first published Sep. 22, 2017).
Qi Baosen et al., "Applications of New Materials", Harbin Institute of Technology Press, Sep. 2007, Brief English Translation Attached.

* cited by examiner

POSITIVE ELECTRODE ACTIVE MATERIAL AND PREPARATION METHOD THEREOF, POSITIVE ELECTRODE PLATE, LITHIUM-ION SECONDARY BATTERY, AND BATTERY MODULE, BATTERY PACK, AND APPARATUS CONTAINING SUCH LITHIUM-ION SECONDARY BATTERY

CROSS-REFERENCE TO RELATED APPLICATIONS

This application is a continuation of International Patent Application No. PCT/CN2020/109855, filed on Aug. 18, 2020, which claims priority to Chinese Patent Application No. 201910825110.4, filed on Sep. 2, 2019. The aforementioned patent applications are incorporated herein by reference in their entirety.

TECHNICAL FIELD

This application relates to the field of secondary battery technologies, and specifically to a positive electrode active material and a preparation method thereof, a positive electrode plate, a lithium-ion secondary battery, and a battery module, battery pack, and apparatus containing such lithium-ion secondary battery.

BACKGROUND

A lithium-ion secondary battery is a type of rechargeable battery, whose operation mainly relies on movement of lithium ions between a positive electrode and a negative electrode, and is a currently widely applied clean energy source. As an important portion of the lithium-ion secondary battery, a positive electrode active material provides lithium ions that reciprocate between the positive electrode and the negative electrode for a battery charging and discharging process. Therefore, the positive electrode active material is crucial to performance of the battery.

A nickel-containing lithium composite oxide has a relatively high theoretical capacity. A lithium-ion secondary battery using a nickel-containing lithium composite oxide as the positive electrode active material may be expected to have relatively high energy density, but the lithium-ion secondary battery has relatively poor high-temperature cycling performance in practical applications.

SUMMARY

A first aspect of this application provides a positive electrode active material, including bulk particles and an element M-containing oxide coating layer applied on an exterior surface of each of the bulk particles. The bulk particle includes a nickel-containing lithium composite oxide. Bulk phases of the bulk particles are uniformly doped with element $M^2$. A surface layer of the bulk particle is an exterior doped layer doped with element $M^3$. Element $M^1$ and element $M^3$ are each independently selected from one or more of Mg, Al, Ca, Ce, Ti, Zr, Zn, Y, or B, and element $M^2$ includes one or more of Si, Ti, Cr, Mo, V, Ge, Se, Zr, Nb, Ru, Rh, Pd, Sb, Te, Ce, and W.

The positive electrode active material provided in this application includes a nickel-containing lithium composite oxide, can have a characteristic of relatively high specific capacity, and a lithium-ion secondary battery using the positive electrode active material can have a relatively high energy density. The bulk phases of the bulk particles are uniformly doped with element $M^2$, which can significantly improve structural stability and high-temperature cycling stability of the positive electrode active material. In addition, the surface layer of the bulk particle is an exterior doped layer doped with element $M^3$, and the exterior surface of the bulk particle has an element M-containing oxide coating layer. Element $M^1$ and element $M^3$ have a high degree of lattice matching with the surface of the bulk particle, which can well protect the bulk particle. Therefore, according to this application, cycle life of the positive electrode active material is extended, and gas production of the battery is reduced, thereby significantly improving high-temperature cycling performance and high-temperature storage performance of the lithium-ion secondary battery.

In any of the foregoing embodiments, when the positive electrode active material is in a 78% delithiated state, element $M^2$ has a valence higher than +3, optionally one or more of +4, +5, +6, +7, and +8; or when the positive electrode active material is in a 78% delithiated state, element $M^2$ has more than two different valence states, and element $M^2$ in the highest valence state has one or more valences of +4, +5, +6, +7, and +8. The positive electrode active material satisfying the foregoing condition can have higher structural stability and surface stability, and can also release more lithium ions, thereby further improving energy density, high-temperature cycling performance, and high-temperature storage performance of the battery.

In any of the foregoing embodiments, a relative deviation of local mass concentration of element $M^2$ in the bulk particles may be less than 35%, optionally less than 30%, and further optionally less than 20%. Relatively highly uniform distribution of element $M^2$ in the bulk particles further improves the structural stability of the positive electrode active material, and also enables the positive electrode active material to have a relatively high lithium ion diffusion capability, thereby improving energy density and high-temperature cycling performance of the lithium-ion secondary battery.

In any of the foregoing embodiments, a deviation $\varepsilon$ of a concentration of element $M^2$ in the positive electrode active material with respect to an average mass concentration of element $M^2$ in the bulk particles may satisfy that $\varepsilon<50\%$; optionally $\varepsilon\leq30\%$; and optionally $\varepsilon\leq20\%$. The positive electrode active material satisfies that $\varepsilon$ is within the foregoing ranges, shows good macro and micro consistency, and high particle stability, and therefore may have relatively high capacity extractablility and high-temperature cycling performance.

In any of the foregoing embodiments, in the positive electrode active material, the concentration of element $M^2$ ranges from 500 ppm to 5000 ppm, and optionally from 2500 ppm to 3500 ppm. The positive electrode active material with the concentration of element $M^2$ within the foregoing ranges can better improve high-temperature cycling performance and high-temperature storage performance of the battery, and can also improve energy density of the battery.

In any of the foregoing embodiments, in the positive electrode active material, a concentration of element $M^1$ ranges from 100 ppm to 2000 ppm, and optionally from 1000 ppm to 1500 ppm. The positive electrode active material with the concentration of element $M^1$ within the foregoing ranges can further improve high-temperature cycling performance and high-temperature storage performance of the battery, and can also enable the battery to have relatively high rate performance and capacity performance.

In any of the foregoing embodiments, in the positive electrode active material, a concentration of element $M^3$ ranges from 400-ppm to 3000 ppm, and optionally from 2000 ppm to 2500 ppm. The positive electrode active material with the concentration of element $M^3$ within the foregoing ranges can further improve high-temperature cycling performance and high-temperature storage performance of the battery, and can also enable the battery to have relatively high rate performance and capacity performance.

In any of the foregoing embodiments, element $M^3$ in the bulk particle has a mass concentration gradient decreasing from the exterior surface to the core of the bulk particle. Further optionally, a mass concentration of element $M^3$ in the exterior doped layer is less than a mass concentration of element $M^1$ in the coating layer. The positive electrode active material satisfying the foregoing condition can improve high-temperature cycling performance and high-temperature storage performance of the battery, and make the battery have a relatively high energy density.

In any of the foregoing embodiments, element $M^1$ and element $M^3$ are the same and are both elements L, where element L has a mass concentration gradient decreasing from the exterior surface to the core of the particle of the positive electrode active material, and element L is one or more of Mg, Al, Ca, Ce, Ti, Zr, Zn, Y, and B. Both surface stability and lithium ion transfer performance of the positive electrode active material are good, so that high-temperature cycling performance and high-temperature storage performance of the battery can be improved, and energy density of the battery can be also improved.

In any of the foregoing embodiments, a ratio of a sum of the concentration of element $M^1$ and the concentration of element $M^3$ in the positive electrode active material to a volume average particle size $D_v50$ of the positive electrode active material ranges from 25 ppm/μm to 1000 ppm/μm, optionally from 200 ppm/μm to 700 ppm/μm, and further optionally from 400 ppm/μm to 550 ppm/μm. The positive electrode active material satisfying the foregoing condition can ensure a relatively high gram capacity and good lithium ion transfer performance while improving surface stability, thereby enabling the battery to have relatively high high-temperature cycling performance, high-temperature storage performance, and energy density.

In any of the foregoing embodiments, a thickness of the exterior doped layer ranges from 10% to 30% of the bulk particle size, and optionally from 15% to 25% of the bulk particle size. The thickness of the exterior doped layer within the foregoing ranges is beneficial to improve high-temperature cycling performance and high-temperature storage performance of the battery, and also is beneficial to enable the battery to have a relatively high energy density.

In any of the foregoing embodiments, a thickness of the coating layer ranges from 1 nm to 200 nm, optionally from 50 nm to 160 nm, and further optionally from 90 nm to 120 nm. The thickness of the coating layer within the foregoing ranges is beneficial to enable the battery to have a relatively high energy density, high-temperature cycling performance, and high-temperature storage performance.

In any of the foregoing embodiments, a volume average particle size $D_v50$ of the positive electrode active material ranges from 3 μm to 20 μm, optionally from 5 μm to 11 μm, and further optionally from 6 m to 8 μm. The positive electrode active material with a $D_v50$ within the foregoing ranges can improve cycling performance and rate performance of the battery, and can also improve energy density of the battery.

In any of the foregoing embodiments, a specific surface area of the positive electrode active material ranges from 0.2 $m^2/g$ to 1.5 $m^2/g$, and optionally from 0.3 $m^2/g$ to 1 $m^2/g$. The positive electrode active material with a specific surface area within the foregoing ranges can enable the battery to have relatively high energy density and cycling performance.

In any of the foregoing embodiments, a tap density of the positive electrode active material ranges from 2.3 $g/cm^3$ to 2.8 $g/cm^3$, and optionally from 2.4 $g/cm^3$ to 2.7 $g/cm^3$. The positive electrode active material with a tap density within the foregoing ranges can enable the battery to have a relatively high energy density.

In any of the foregoing embodiments, the nickel-containing lithium composite oxide is a compound represented by formula 1, $$Li_{1+a}[Ni_xCo_yMn_zM^2_bM^3_d]O_{2-p}X_p \quad \text{Formula 1}$$

In the formula 1, X is selected from one or more of F, N, P, and S, $0.5 \le x < 1$, $0 \le y < 0.3$, $0 \le z < 0.3$, $-0.2 < a < 0.2$, $0 < b < 0.2$, $0 < d < 0.2$, $0 \le p < 0.2$, $x+y+z+b+d=1$, and element $M^2$ and element $M^3$ each are defined in this specification.

A second aspect of this application provides a positive electrode plate, including a positive electrode current collector and a positive electrode active substance layer disposed on the positive electrode current collector, where the positive electrode active substance layer includes the positive electrode active material in this application.

The positive electrode plate of this application includes the positive electrode active material, thereby enabling a lithium-ion secondary battery using the positive electrode plate to have relatively high high-temperature cycling performance and high-temperature storage performance.

A third aspect of this application provides a lithium-ion secondary battery, including the positive electrode plate of this application.

The lithium-ion secondary battery of this application includes the positive electrode plate, thereby having relatively high energy density, high-temperature cycling performance, and high-temperature storage performance.

A fourth aspect of this application provides a battery module, including the lithium-ion secondary battery of this application.

A fifth aspect of this application provides a battery pack, including the lithium-ion secondary battery or battery module of this application.

A sixth aspect of this application provides an apparatus, including at least one of the lithium-ion secondary battery, battery module, or battery pack of this application.

The battery module, the battery pack, and the apparatus in this application include the lithium-ion secondary battery of this application, and therefore have at least the same or similar effects as the lithium-ion secondary battery.

A seventh aspect of this application provides a preparation method of a positive electrode active material, including:

(a) providing a mixture, where the mixture includes a nickel-containing transition metal source, a lithium source, and a precursor of element $M^2$;

(b) subjecting the mixture to a sintering treatment to obtain matrix particles uniformly doped with element $M^2$;

(c) mixing the matrix particles and a precursor of element $M^3$ and subjecting the resulting mixture to a sintering treatment to enable element $M^3$ to be doped into a surface layer of the matrix particle to form the exterior doped layer, so as to obtain bulk particles; and (d) mixing the bulk particles and a precursor of element $M^1$ and subjecting the resulting mixture to a sintering treatment to form an element $M^1$-containing oxide coating layer on an exterior surface of the bulk particle, so as to obtain the positive electrode active material.

Element $M^1$ and element $M^3$ each are independently selected from one or more of Mg, Al, Ca, Ce, Ti, Zr, Zn, Y, and B, and element $M^2$ includes one or more of Si, Ti, Cr, Mo, V, Ge, Se, Zr, Nb, Ru, Rh, Pd, Sb, Te, Ce, and W.

In any of the foregoing embodiments, a sintering temperature in step (b) ranges from 600° C. to 1000° C., optionally from 600° C. to 900° C., and further optionally from 650° C. to 850° C.

In any of the foregoing embodiments, a sintering temperature in step (c) ranges from 400° C. to 750° C., and optionally from 450° C. to 700° C.

In any of the foregoing embodiments, a sintering temperature in step (d) ranges from 100° C. to 500° C., and optionally from 200° C. to 450° C.

DETAILED DESCRIPTION OF EMBODIMENTS

To make the objectives, technical solutions, and beneficial technical effects of this application clearer, this application is further described below in detail with reference to embodiments. It should be understood that the embodiments described in this specification are merely intended to interpret this application, but not intended to limit this application.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded.

In the description of this specification, it should be noted that, unless otherwise stated, "above" and "below" means inclusion of the number itself, and "more" in "one or more" means at least two.

In the description of this specification, unless otherwise specified, the term "or (or)" is inclusive. For example, the phrase "A or (or) B" means "A, B, or both A and B". More specifically, the condition "A or B" is satisfied by any one of the following conditions: A is true (or present) and B is false (or not present), A is false (or not present) and B is true (or present), or both A and B are true (or present).

The foregoing invention content of this application is not intended to describe each of the disclosed embodiments or implementations of this application. The following description illustrates exemplary embodiments in more detail by using examples. Throughout this application, guidance is provided by using a series of embodiments and the embodiments may be used in various combinations. In each instance, enumeration is only representative but should not be interpreted as exhaustive.

Positive Electrode Active Material

Figure 1:
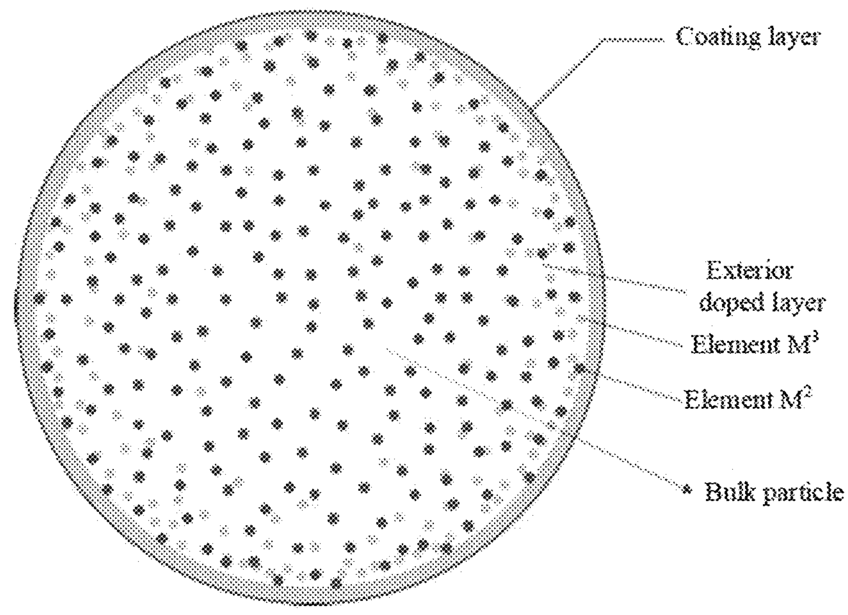
FIG. 1 is a schematic diagram of coating and doping in a positive electrode active material according to an embodiment of this application.

This application provides a positive electrode active material. As shown in FIG. 1, the positive electrode active material includes bulk particles and an element $M^1$-containing oxide coating layer applied on an exterior surface of each of the bulk particles. The bulk particle includes a nickel-containing lithium composite oxide. Bulk phases of the bulk particles are uniformly doped with element $M^2$. A surface layer of the bulk particle is an exterior doped layer doped with element $M^3$. Element $M^1$ and element $M^3$ are each independently selected from one or more of Mg, Al, Ca, Ce, Ti, Zr, Zn, Y, and B, and element $M^2$ includes one or more of Si, Ti, Cr, Mo, V; Ge, Se, Zr, Nb, Ru, Rh, Pd, Sb, Te, Ce, and W.

The bulk phase of the bulk particle refers to the entire bulk particle; and the surface layer of the bulk particle is a zone extending to a predetermined depth from the exterior surface to the core of the bulk particle.

The positive electrode active material in this application includes a nickel-containing lithium composite oxide, and can have a characteristic of relatively high specific capacity, and therefore a lithium-ion secondary battery using this positive electrode active material can have relatively high energy density. Optionally, in the nickel-containing lithium composite oxide, the number of moles of nickel ranges from 50% to 95% of the total number of moles of transition metal site elements. Optionally, based on the total number of moles of transition metal site elements in the nickel-containing lithium composite oxide, the number of moles of nickel is greater than or equal to 50%, greater than or equal to 60%, greater than or equal to 65%, greater than or equal to 70%, greater than or equal to 75%, or greater than or equal to 80%. Further optionally, based on the total number of moles of transition metal site elements in the nickel-containing lithium composite oxide, the number of moles of nickel is less than or equal to 80%, less than or equal to 85%, less than or equal to 90%, or less than or equal to 95%. A battery using a positive electrode active material with high nickel content has a relatively high energy density.

The nickel-containing lithium composite oxide has a layered structure with lithium sites, transitional metal sites, and oxygen sites. The transition metal site elements refer to elements at transition metal sites.

Element $M^2$ is uniformly doped in the bulk phases of the bulk particles, which can effectively bind oxygen atoms, make the positive electrode active material difficult to release oxygen during high-temperature cycling, and inhibit an irreversible structural phase change of the material, to ensure that the material structure is maintained in a laminar phase state with strong electrochemical activity, thereby significantly improving structural stability and high-temperature cycling stability of the positive electrode active material, and improving cycling performance and safety performance of the lithium-ion secondary battery, where high-temperature cycling performance of the battery is improved.

In some embodiments, element $M^2$ may include one or more of Si, Mo, V, Nb, Sb, Te, and W. Optionally, element $M^2$ may include one or more of Mo, V, Nb, Sb, and W. Appropriate element $M^2$ can better play the foregoing effects, further improving high-temperature cycling performance of the battery.

Element $M^3$ is doped in the surface layer of the bulk particle to form the exterior doped layer, and the exterior surface of the bulk particle has the element $M^1$-containing oxide coating layer. Element $M^1$ and element $M^3$ have a high degree of lattice matching with the surface of the bulk particle, which does not damage the structure of the bulk particle, and well protects the bulk particle. The element $M^1$-containing oxide coating layer can insulate the bulk particles from contacting with the electrolyte, and the element $M^3$-containing exterior doped layer can reduce side reaction activity on the surface of the bulk particle. Under the protection of both the coating layer and the exterior doped layer, the surface of the positive electrode active material is not prone to be corroded by the electrolyte, and side reactions are reduced, thereby improving high-temperature cycling performance of the battery, effectively suppressing gas production of the battery during high-temperature storage, and improving high-temperature storage performance of the battery.

In some embodiments, element $M^1$ includes one or more of Al, Ti, Zr, and B. Appropriate element $M^1$ can better protect the bulk particle, further improving high-temperature cycling performance and high-temperature storage performance of the battery.

In some embodiments, element $M^3$ includes one or more of Mg, Al, Ca, Ti, Zr, Zn, and B. Optionally, element $M^3$ includes one or more of Al, Ti, Zr, and B. Appropriate element $M^3$ can further reduce side reaction activity on the surface of the bulk particle, further improving high-temperature cycling performance and high-temperature storage performance of the battery.

In some optional embodiments, when the positive electrode active material is in a 78% delithiated state, element $M^2$ has a valence higher than or equal to +3, optionally one or more of +4, +5, +6, +7, and +8, and further optionally, one or more of +4, +5, and +6. In an example, element $M^2$ may include one or more of Si, W, and the like.

In this specification, "78% delithiated state" refers to a state of a battery during the charging where the number of moles of lithium released from the positive electrode active material is 78% of the theoretical amount of lithium. During practical use of the secondary battery, generally a "fully charged state" is set up, and a "charge cut-off voltage" is correspondingly set, to ensure safe use of the battery. "Fully charged state" means that a state of charge (SOC) of the secondary battery is 100%, in other words, a secondary battery with a positive electrode including the positive electrode active material is charged to the charge cut-off voltage within the range allowed by reversible charge and discharge. The "fully charged state" or "charge cut-off voltage" may differ due to different positive electrode active materials or different security requirements. A secondary battery prepared by using a positive electrode active material with a nickel-containing lithium composite oxide is in a "fully charged state", the positive electrode active material generally is in a "78% delithiated state" to ensure a normal use.

In this specification, a research on the positive electrode active material in a "78% delithiated state" is conducted with reference to a correspondence between a "delithiated state" and a charging voltage. Specifically, a series of batteries using the positive electrode active material are separately charged to 2.8V, 2.9V, 3.0V, 3.1V, 3.2V, 3.3V, . . . , 4.0V, 4.1V, 4.2V, 4.3V, 4.4V, 4.5V, 4.6V, 4.7V (with a charging voltage increment of 0.1V) at a current rate of 0.1 C. Then the positive electrode plates of the batteries are removed, electrolytes are washed away from the positive electrode plates, and the positive electrode active material is digested. Mass concentrations of Li, transition metals, and element O in the positive electrode active material are tested by using an inductively coupled plasma-optical emission spectrometer (ICP-OES), a stoichiometric ratio of elements in the positive electrode active material at the charging voltage is calculated, a chemical formula of the positive electrode active material at the charging voltage is obtained through conversion, and then a charge voltage corresponding to the "78% delithiated state" is obtained.

The battery including the positive electrode active material to be tested is charged to a voltage corresponding to the "78% delithiated state", and then is disassembled to obtain the positive electrode active material in a "78% delithiated state" for further research. The valence of element $M^2$ in the positive electrode active material in the "78% delithiated state" may be obtained through an X-ray photoelectron spectroscopy (XPS) analysis test. More precisely, the valence may be determined through synchrotron radiation photoelectron spectroscopy (SRPES) analysis.

The valence state of element $M^2$ in the positive electrode active material in the 78% delithiated state is relatively high, which can better maintain oxygen atoms at their original lattice sites, prevent the positive electrode active material from releasing oxygen during heating and high-temperature cycling after delithiation, and inhibit irreversible structural phase transition, thereby further improving structural stability and high-temperature cycling stability of the positive electrode active material. In addition, element $M^2$ can provide more electrons for the positive electrode active material, which can make the structure of the positive electrode active material more stable, reduce surface activity of the positive electrode active material, and reduce gassing due to electrolyte decomposition during high-temperature cycling and high-temperature storage. Therefore, both high-temperature cycling performance and high-temperature storage performance of the battery can be improved. In addition, electrons contributed by element $M^2$ can also allow the positive electrode active material to release more lithium ions, thereby further improving the energy density of the battery.

It may be understood that the valence state of element $M^2$ may remain unchanged before and after delithiation, and element $M^2$ does not participate in the redox reaction during the battery charging. Element $M^2$ can stabilize the layered crystal structure of the positive electrode active material.

Element $M^2$ in the positive electrode active material may also participate in the redox reaction during the battery charging. Element $M^2$ has more than two stable valence states, and is in a lower valence state in the positive electrode active material before delithiation. During battery charging, element $M^2$ contributes electrons to the positive electrode active material and its valence state increases. During battery charging, the electrons contributed by element $M^2$ enables charge compensation to take place inside the material, which can increase the concentration of lithium ions that can be released from the positive electrode active material, thereby improving the capacity performance and energy density of the battery. Moreover, element $M^2$ after the increase of valence state may strengthen the binding of oxygen atoms, improve the structural stability of the positive electrode active material, reduce the surface activity of the positive electrode active material, and improve high-temperature cycling performance and high-temperature storage performance of the battery.

In some embodiments, in the positive electrode active material in a "78% delithiated state", element $M^2$ may have more than two different valence states, and element $M^2$ in the highest valence state has one or more valences of +4, +5, +6, +7 valence, and +8, and further optionally, one or more of +5, and +6. In an example, element $M^2$ may include one or more of Mo, V, Nb, Sb, and Te. In another example, element $M^2$ may include one or more of Mo, V, Nb, and Sb.

Element $M^2$ at a higher valence state and with a variable valence state can contribute more electrons to the positive electrode active material, which can further stabilize the material structure and reduce side reactions on surface of the material, thereby further improving high-temperature cycling performance and high-temperature storage performance of the battery. In addition, when the positive electrode active material is in a 78% delithiated state, element $M^2$ has more than two different valence states, and element $M^2$ in a lower valence state can further contribute electrons to allow the positive electrode to release more lithium ions, thereby further improving energy density of the battery.

In some optional embodiments, a relative deviation of local mass concentration of element $M^2$ in the bulk particles of the positive electrode active material is less than 35%, and further optionally, less than 30%, or furthermore optionally, less than 20%, less than 16%, less than 13%, less than 12%, less than 11%, or less than 10%.

In this specification, the local mass concentration of element $M^2$ in the bulk particles is a mass concentration of element $M^2$ in all elements in a finite volume element at any selected site in the bulk particles, and may be obtained by testing element concentration distribution through energy dispersive X-Ray spectroscopy (EDX) or energy dispersive spectrometer (EDS) element analysis in combination with transmission electron microscope (TEM) or scanning electron microscope (SEM) single-point scanning, or using other similar methods. When the test is performed through EDX or EDS element analysis in combination with TEM or SEM single-point scanning, the mass concentrations of element $M^2$ in μg/g at different sites in the bulk particles are respectively denoted as $\eta_1, \eta_2, \eta_3, \ldots, \eta_n$, where n is a positive integer greater than or equal to 15.

An average mass concentration of element $M^2$ in the bulk particles is a mass concentration of element $M^2$ in all elements within a single bulk particle, and may be obtained by testing element concentration distribution through EDX or EDS element analysis in combination with TEM or SEM plane scanning, or using other similar methods. When the test is performed in the manner of testing element concentration distribution through EDX or EDS element analysis in combination with TEM or the SEM plane scanning, the testing plane includes all points in the foregoing single-point testing. The average mass concentration of element $M^2$ in the bulk particles is denoted as $\bar{\eta}$ in μg/g.

The relative deviation σ of local mass concentration of element $M^2$ in the bulk particles is calculated according to the following equation (1):

$$\sigma = \frac{\max\{|\eta_1 - \bar{\eta}|, |\eta_2 - \bar{\eta}|, |\eta_3 - \bar{\eta}|, \ldots, |\eta_n - \bar{\eta}|\}}{\bar{\eta}} \tag{1}$$

A relative deviation of local mass concentration of element $M^2$ in the bulk particles is less than 35%, optionally less than 30%, and further optionally less than 20%, which means that element $M^2$ is highly uniformly distributed in the bulk particles. The uniform doping of element $M^2$ makes the properties of the particles consistent throughout the interior, so that the structural stability of the positive electrode active material may be better improved by element $M^2$, effectively preventing the particle from cracking. In this case, migration and diffusion capabilities of lithium ions at different internal zones of the particle uniformly doped with element $M^2$ are at the same level, and deformation resistance is close throughout the particle, so that the internal stress distribution of the particle is uniform, thereby improving structural stability of the positive electrode active material, and the particles are not prone to crack. Therefore, both capacity development and high-temperature cycling performance of the positive electrode active material are further improved, thereby improving capacity performance, energy density and high-temperature cycling performance of the lithium-ion secondary battery.

A smaller relative deviation of the local mass concentration of element $M^2$ in the bulk particles means a more uniform distribution of the doping element $M^2$ in the bulk particles, which can better improve capacity development and high-temperature cycling performance of the positive electrode active material.

In some optional embodiments, a deviation ε of the concentration of element $M^2$ in the positive electrode active material with respect to an average mass concentration $\bar{\eta}$ of element $M^2$ in the bulk particles satisfies ε<50%, optionally, ε≤30%, and further optionally, ε≤20%, ≤15%, ≤13%, ≤12%, or ≤10%.

ε is calculated by equation (2):

$$\varepsilon = \frac{|\omega - \bar{\eta}|}{\omega} \tag{2}$$

where ω is global mass concentration of element $M^2$ in ppm in the positive electrode active material, that is, the mass of element $M^2$ contained per gram of the positive electrode active material in g. ω represents the concentration of element $M^2$ in overall macroscopic positive electrode active material, including element $M^2$ doped into the bulk particles of the positive electrode active material, element $M^2$ enriched in other phases on surfaces of the bulk particles, and element $M^2$ embedded in the particles of the positive electrode active material. ω may be obtained through absorption spectrum tests of the positive electrode active material solution, for example inductive coupled plasma atomic emission spectrometer (ICP) test, X-ray absorption fine structure spectroscopy (XAFS) test, or another test.

The positive electrode active material satisfying ε within the foregoing ranges means that element $M^2$ is successfully doped in the bulk particles. The concentration of doping element distributed in other phases on the surface of the bulk particle, and the concentration of doping element embedded in the gaps in the positive electrode active material are relatively low. The positive electrode active material shows good macro and micro consistency and has uniform structure and high particle stability, which is beneficial to enable the positive electrode active material to have higher capacity development and high-temperature cycling performance.

The concentration ω of element $M^2$ in the positive electrode active material optionally ranges from 500 ppm to 5000 ppm. Optionally, ω≥500 ppm, ≥800 ppm, ≥1000 ppm, ≥1200 ppm, ≥1500 ppm, ≥1700 ppm, ≥2000 ppm, ≥2500 ppm, or ≥3000 ppm. Optionally, ω≤3500 ppm, ≤4000 ppm, ≤5000 ppm, ≤7000 ppm, or the like. Further optionally, 3000 ppm≤ω≤4000 ppm, 2500 ppm≤ω≤3500 ppm, or the like. The positive electrode active material with the concentration ω of element $M^2$ within the foregoing ranges can better improve high-temperature cycling performance and high-temperature storage performance of the battery, and enable element $M^2$ to effectively provide charge compensation for the positive electrode active material.

The positive electrode active material with the concentration ω of element $M^2$ within the foregoing ranges also enables the positive electrode active material to provide a good carrier for delithiation of lithium ions, facilitating the intercalation and deintercalation of lithium ions, so that the positive electrode active material has relatively high initial capacity and cycling capacity retention rate, thereby improving energy density and high-temperature cycling performance of the battery.

The concentration α of element $M^1$ in the positive electrode active material optionally ranges from 100 ppm to 2000 ppm. Optionally, α≥100 ppm, ≥300 ppm, ≥500 ppm, ≥600 ppm, ≥800 ppm, ≥900 ppm, ≥1000 ppm, ≥1100 ppm, or ≥1200 ppm. Optionally, α≤1300 ppm, ≤1400 ppm, ≤1500 ppm, ≤1700 ppm, ≤2000 ppm, or the like. Further optionally, 800 ppm≤α≤1500 ppm, 1000 ppm≤α≤1500 ppm, 1000 ppm≤α≤1300 ppm, or the like.

The concentration β of element $M^3$ in the positive electrode active material optionally ranges from 400 ppm to 3000 ppm. Optionally, β≥400 ppm, ≥700 ppm, ≥1000 ppm, ≥1300 ppm, ≥1500 ppm, ≥1800 ppm, ≥2000 ppm, or ≥2200 ppm. Optionally, β≤2300 ppm, ≤2400 ppm, ≤2500 ppm, ≤2700 ppm, ≤3000 ppm, or the like. Further optionally, 1800 ppm≤β≤2500 ppm, 2000 ppm≤β≤2500 ppm, 2100 ppm≤β≤2300 ppm, or the like.

The positive electrode active material with the concentration of element $M^1$ or element $M^3$ within the foregoing ranges can improve stability of the positive electrode active material, reduce side reactions of the electrolyte on surface of the material, and improve high-temperature cycling performance and high-temperature storage performance of the battery. In addition, coating and doping are done in only a small part of the bulk particle surface, and therefore, it may be ensured that the positive electrode active material has a relatively high lithium ion diffusion capability, enabling the battery to have relatively high rate performance, capacity performance, and cycling performance.

The ppm (parts per million) is a ratio of mass of an element in the positive electrode active material to mass of the positive electrode active material. α and β may be obtained through absorption spectrum tests of the positive electrode active material solution, for example inductive coupled plasma emission spectrometer (ICP) test, X-ray absorption fine structure spectroscopy (XAFS) test, or another test.

In some embodiments, a thickness of the coating layer ranges from 1 nm to 200 nm, for example, from 50 nm to 160 nm, from 80 nm to 140 nm, or from 90 nm to 120 nm. The coating layer in a thickness within the foregoing ranges can avoid contact between the electrolyte and the bulk particles, reduce side reactions, and enable the positive electrode active material to have a relatively high lithium ion diffusion capability, which is beneficial to enable the battery to have relatively high capacity performance, high-temperature cycling performance, and high-temperature storage performance.

The thickness of the coating layer may be determined by using a method well known in the art. In an example, a cross-section polisher (for example, IB-09010CP argon ion cross-section polisher from the electronic company JEOL in Japan) may be used for preparing a cross-section of a particle of the positive electrode active material. The cross-section passes through the core of the particle of the positive electrode active material. Then a distribution graph of elements in the cross-section is obtained through EDX or EDS element analysis in combination with TEM or SEM (for example, X-Max EDS from Oxford Instruments Group in UK in combination with Sigma-02-33 SEM from ZEISS in German) plane scanning; and the thickness of the coating layer is obtained based on the distribution of elements in the cross-section. More precisely, thickness values of the coating layer at multiple (more than 3, for example, 8, 10, or 12) locations in the cross-section may be determined, and an average thereof is recorded as the thickness of the coating layer.

In some embodiments, a thickness of the exterior doped layer is 10% to 30% of the particle size of the bulk particle, for example, 15% to 25% of the particle size of the bulk particle, 19% to 22% of the particle size of the bulk particle, or the like. The thickness of the exterior doped layer within the foregoing ranges is beneficial to improve high-temperature cycling performance and high-temperature storage performance of the battery, and also is beneficial to capacity development of the positive electrode active material, so that the battery has a relatively high energy density.

The thickness of the exterior doped layer may be determined by using a method well known in the art, for example, it may be determined with reference to the test method for the thickness of the coating layer. In an example, a cross-section polisher may be used for preparing a cross-section of the positive electrode active material particle or the bulk particle. The cross-section passes through the core of the particle. Then a distribution graph of elements in the cross-section is obtained through EDX or EDS element analysis in combination with TEM or SEM plane scanning; and the thickness of the exterior doped layer is obtained based on the distribution of elements in the cross section. More precisely, thicknesses of the exterior doped layer at different (more than 3, for example, 8, 10, or 12) locations in the cross-section may be determined, and an average thereof is recorded as the thickness of the exterior doped layer.

Similarly, the particle size of the bulk particle may also be obtained according to the foregoing method. In a case that the bulk particle is not perfectly spherical, diameters of the bulk particle in multiple (more than 3, for example, 8, 10, or 12) different orientations may be determined, and an average thereof is recorded as the particle size of the bulk particle.

In some optional embodiments, element $M^3$ in the bulk particle has a mass concentration gradient decreasing from the exterior surface to the core of the bulk particle. The mass concentration of element $M^3$ in the bulk particle has a trend of decrease from the exterior surface to the core of the bulk particle, which can improve lithium ion conduction performance of the positive electrode active material, and improve capacity performance and cycling performance of the battery.

Further optionally, a mass concentration of element $M^3$ in the exterior doped layer is less than a mass concentration of element $M^1$ in the coating layer. To be specific, there are a relatively high concentration of element $M^1$ in the cladding layer and a relatively low concentration of element $M^3$ in the exterior doped layer. The modified elements are mainly present on the surface of the positive electrode active material, which is beneficial to form surface protection of the positive electrode active material, improve high-temperature cycling performance and high-temperature storage performance of the battery, and enable the battery to have relatively high capacity development and energy density.

It may be understood that element $M^1$ in the coating layer may be the same as or different from element $M^3$ in the exterior doped layer. For example, element $M^1$ in the coating layer is the same as element $M^3$ in the exterior doped layer, and both are L element, where L element is one or more of Mg, Al, Ca, Ce, Ti, Zr, Zn, Y, and B. Further, the concentration of element L has a mass concentration gradient decreasing from the exterior surface to the core of the particle of the positive electrode active material, which is beneficial to protect the surface of the positive electrode active material, improve high-temperature cycling performance and high-temperature storage performance of the battery, and improve capacity development and energy density of the battery.

In some embodiments, a ratio of a sum of the concentration of element $M^1$ and the concentration of element $M^3$ in the positive electrode active material to a volume average particle size $D_v50$ of the positive electrode active material ranges from 25 ppm/μm to 1000 ppm/μm, optionally from 200 ppm/μm to 700 ppm/μm, and further optionally from 300 ppm/μm to 600 ppm/μm, or from 400 ppm/μm to 550 ppm/μm, which is beneficial to protect the surface of the positive electrode active material, improve high-temperature cycling performance and high-temperature storage performance of the battery, and improve capacity development of the positive electrode active material, so that the energy density of the battery is improved.

In some embodiments, the positive electrode active material includes secondary particles formed by agglomeration of primary particles. In this embodiment, the above-mentioned "bulk particles" include the secondary particles.

Optionally, the morphology of the positive electrode active material according to the embodiments of this application is one or more of a sphere and a sphere-like body.

The volume average particle size $D_v50$ of the positive electrode active material ranges from 3 μm to 20 μm, further optionally from 5 μm to 11 μm, and further optionally from 6 μm to 8 μm.

The $D_v50$ of the positive electrode active material is optionally less than 20 μm, further optionally less than 11 μm, and further optionally less than 8 μm. The migration path of lithium ions and electrons in the material is relatively short, which can improve transmission and diffusion performance of lithium ions and electrons in the positive electrode active material, thereby improving cycling performance and rate performance of the battery. The $D_v50$ of the positive electrode active material is optionally greater than 3 μm, further optionally, greater than 5 μm, or also optionally, greater than 6 μm. The side reactions of the electrolyte on surface of the positive electrode active material are reduced, and the agglomeration among the particles of the positive electrode active material is reduced, thereby improving cycling performance of the positive electrode active material.

In addition, the $D_v50$ of the positive electrode active material within the foregoing ranges is also beneficial to enable the positive electrode active material to have relatively high compacted density and improve energy density of the battery:

The specific surface area of the positive electrode active material ranges from 0.2 $m^2/g$ to 1.5 $m^2/g$, further optionally from 0.3 $m^2/g$ to 1 $m^2/g$, or still further optionally from 0.5 $m^2/g$ to 0.8 $m^2/g$. The specific surface area of the positive electrode active material within the foregoing ranges ensures that the positive electrode active material has a relatively high active specific surface area, and is beneficial to reduce side reactions of the electrolyte on surface of the positive electrode active material, thereby improving capacity development and cycle life of the positive electrode active material.

Atap density of the positive electrode active material optionally ranges from 2.3 $g/cm^3$ to 2.8 $g/cm^3$, and further optionally from 2.4 $g/cm^3$ to 2.7 $g/cm^3$. The positive electrode active material with the tap density within the foregoing ranges is beneficial to enable the battery to have a relatively high energy density.

In some embodiments, the nickel-containing lithium composite oxide is a compound represented by chemical formula 1, and the positive electrode active material has an element $M^1$-containing oxide coating layer applied on the exterior surface of the bulk particles including the compound represented by chemical formula 1.

$$Li_{1+a}[Ni_xCo_yMn_zM^2_bM^3_d]O_{2-p}X_p \quad \text{Chemical formula 1}$$

In chemical formula 1, $M^2$ is a doping substitute for one or more of a nickel site, a cobalt site, and a manganese site in the bulk phase of the bulk particle; $M^3$ is a doping substitute for one or more of a nickel site, a cobalt site, and a manganese site of the bulk phase of the bulk particle; X may be an element for substituting the oxygen site in the bulk phase of the bulk particle or surface layer, or may substitute for at least part of oxygen element in the coating layer, and X is preferably selected from one or more of F, N, P, and S; and $0.5 \le x < 1$, $0 \le y < 0.3$, $0 \le z < 0.3$, $-0.2 < a < 0.2$, $0 < b < 0.2$, $0 < d < 0.2$, $0 \le p < 0.2$, and $x+y+z+b+d=1$. The battery using this high-nickel ternary material can have relatively high energy density, high-temperature cycling performance, and high-temperature storage performance. Element $M^1$, element $M^2$, and element $M^3$ each are defined in this specification.

Optionally, $0.6 \le x \le 0.9$, for example, $0.7 \le x \le 0.8$. Optionally, $0 < y < 0.3$; $0 < z < 0.3$.

In this specification, the $D_v50$ of the positive electrode active material has the meaning well known in the art, or be known as median particle size, representing a corresponding particle size when a volume distribution of the positive electrode active material particles reaches 50%. The $D_v50$ of the positive electrode active material may be determined by using instruments and methods that are well known in the art, for example, may be easily determined by using a laser particle size analyzer (for example, a Mastersizer 3000 type from Malvern Instruments Ltd in UK).

The specific surface area of the positive electrode active material has the meaning well known in the art, and may be determined by using instruments and methods that are well known in the art, for example, may be determined by using the nitrogen adsorption specific surface area analysis test method and calculated by using the Brunauer Emmett Teller (BET) method. The nitrogen adsorption specific surface area analysis test may be carried out by using the NOVA 2000e specific surface area and pore size analyzer from Quantachrome company in USA. In a specific example, the test method is as follows: Approximately 8.000 g to 15.000 g of the positive electrode active material is placed into a weighed empty sample tube. The positive electrode active material is stirred well and weighed. The sample tube is put into the NOVA 2000e degassing station for degassing. Total mass of the degassed positive electrode active material and the sample tube is weighed. Mass G of the positive electrode active material after degassing is calculated by subtracting the mass of the empty sample tube from the total mass. The sample tube is put into the NOVA 2000e, adsorption amounts of nitrogen on surface of the positive electrode active material at different relative pressures are determined, an adsorption amount of a monomolecular layer is calculated according to the Brunauer-Emmett-Teller multilayer adsorption theory and its equation, then a total surface area A of the positive electrode active material is calculated, and the specific surface area of the positive electrode active material is calculated by A/G.

The tap density of the positive electrode active material has the meaning well known in the art, and may be tested by using instruments and methods that are well known in the art, for example, may be easily tested by using a tap density meter (for example, FZS4-4B type).

The following describes a preparation method of a positive electrode active material. Any one of the foregoing positive electrode active materials can be prepared by the preparation method. The preparation method includes the following steps.

S10. Provide a mixture, where the mixture includes a nickel-containing transition metal source, a lithium source, and a precursor of element $M^2$.

The nickel-containing transition metal source is, for example, one or more of an oxide, a hydroxide, or a carbonate containing Ni and optionally Co and/or Mn, for example, a hydroxide containing Ni, Co, and Mn.

The nickel-containing transition metal source may be obtained through a method known in the art, for example, prepared through a co-precipitation method, a gel method or a solid phase method.

In an example of preparing a hydroxide containing Ni, Co, and Mn, a mixed solution is obtained by dispersing the Ni source, Co source, and Mn source into solvent. With continuous co-current reaction, the mixed solution, a strong alkali solution, and a complexing agent solution are pumped into a reactor with stirring function at the same time, where the pH value of the reaction solution is controlled to be 10 to 13, the temperature in the reactor controlled to be 25° C. to 90° C., and inert gas protection is provided during the reaction. After the reaction is completed, aging, filtering, washing, and vacuum drying are carried out, the hydroxide containing Ni, Co and Mn is obtained.

The Ni source may be a soluble nickel salt, for example, one or more of nickel sulfate, nickel nitrate, nickel chloride, nickel oxalate, and nickel acetate, for another example, one or more of nickel sulfate and nickel nitrate, and for still another example, nickel sulfate. The Co source may be a soluble cobalt salt, for example, one or more of cobalt sulfate, cobalt nitrate, cobalt chloride, cobalt oxalate, and cobalt acetate, for another example, one or more of cobalt sulfate and cobalt nitrate, and for still another example, cobalt sulfate. The Mn source may be soluble manganese salt, for example, one or more of manganese sulfate, manganese nitrate, manganese chloride, manganese oxalate, and manganese acetate, for another example, one or more of sulfuric acid manganese and manganese nitrate, and for still another example, manganese sulfate.

The strong alkali may be one or more of LiOH, NaOH, and KOH, for example, NaOH. The complexing agent may be one or more of ammonia, ammonium sulfate, ammonium nitrate, ammonium chloride, ammonium citrate, and disodium ethylenediaminetetraacetic acid (EDTA), for example, ammonia.

The solvents of the mixed solution, strong alkali solution, and complexing agent solution are not particularly limited, for example, the solvents of the mixed solution, strong alkali solution, and complexing agent solution each are separately one or more of deionized water, methanol, ethanol, acetone, isopropanol, and n-hexanol, for example, deionized water.

The inert gas introduced during the reaction is, for example, one or more of nitrogen, argon, and helium.

The lithium source may be one or more of lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$), and lithium nitrate ($LiNO_3$). Further, the lithium source is one or more of lithium carbonate, lithium hydroxide, and lithium nitrate; and furthermore, the lithium source is lithium carbonate.

The precursor of element $M^2$ may be one or more of oxide, nitric acid compound, carbonic acid compound, hydroxide compound, and acetic acid compound of element $M^2$, and may be selected based on an actual requirement.

In step S10, a ball mill mixer or a high-speed mixer may be used to mix the materials to obtain a well mixed mixture. For example, the nickel-containing transition metal source, the lithium source, and the precursor of element $M^2$ are added into a high-speed mixer for mixing for 0.5 hours to 2 hours.

S20. Subject the mixture to a sintering treatment to obtain matrix particles uniformly doped with element $M^2$.

In step S20, the mixture may be sintered in an atmosphere sintering furnace. The sintering atmosphere is an atmosphere containing oxygen, for example, an air or oxygen atmosphere. An oxygen concentration in the sintering atmosphere is, for example, higher than 70%, further, higher than 80%, or furthermore, higher than 85%. The sintering temperature ranges, for example, from 600° C. to 1000° C., further, from 600° C. to 900° C., or furthermore, from 650° C. to 850° C. This is beneficial to enable element $M^2$ to have relatively high doping uniformity. The sintering duration may be adjusted based on an actual situation, for example, 5 hours to 25 hours, or for another example, 5 hours to 15 hours.

It should be noted that in the preparation of the positive electrode active material, many theoretically feasible ways may be used to control the distribution of element $M^2$ in the lithium nickel composite oxide and the valence state of element $M^2$ in the lithium nickel composite oxide in the "78% delithiated state", for example, the valence state of the precursor itself of element $M^2$, the concentrations and ratios of the precursors of different element $M^2$ valence states, the oxidation of the sintering atmosphere during doping, the number of sintering times, the uniformity of mixing, the sintering temperature, or the sintering time. In this application file, methods of controlling the type of doping precursor, sintering time and temperature in step S20 are listed to obtain a series of positive electrode active materials. The positive electrode active materials have characteristics of high energy density, thermal stability, and high-temperature cycling stability. Preferably, the positive electrode active material subjected to the doping homogeneity of element $M^2$ being further controlled and having the characteristics of the valence state of element $M^2$ in the 78% delithiated state has a better effect.

In some embodiments, the sintered product in step S20 may be crushed and sieved to obtain the positive electrode active material with optimized particle size distribution and specific surface area. The crushing method is not particularly limited, and may be selected based on an actual need, for example, using a particle crusher.

S30. Mix the matrix particles and a precursor of element $M^3$ and subject the resulting mixture to a sintering treatment to enable element $M^3$ to be doped into a surface layer of the matrix particle to form the exterior doped layer, so as to obtain bulk particles.

The precursor of element $M^3$ may be one or more of a chloride, a sulfate, a nitrate, an oxide, a hydroxide, a fluoride, a carbonate, a phosphate, a dihydrogen phosphate, and an organic compound of element $M^3$, but not limited thereto.

In step S30, a ball mill mixer or a high-speed mixer may be used to mix the materials. For example, the matrix material and the precursor of element $M^3$ are added into a high-speed mixer for mixing. The mixing time may range from 0.5 hours to 2 hours.

The mixed material is added into an atmosphere sintering furnace for sintering. The sintering atmosphere is an atmosphere containing oxygen, for example, an air or oxygen atmosphere. The sintering temperature ranges, for example, from 400° C. to 750° C., or for another example, from 450° C. to 700° C. The sintering time may range from 3 hours to 25 hours, for example, from 5 hours to 10 hours. During sintering, element $M^3$ is diffused from the exterior surface to the bulk phase of the matrix particle to a predetermined depth, forming an exterior doped layer. The doping of element $M^3$ is carried out after lithiation is completed, so that it is beneficial to make element $M^3$ exist on surfaces of the bulk particles as much as possible, and the concentration of element $M^3$ has a concentration gradient gradually decreasing from the exterior surface to the core of the bulk particle.

S40. Mix the bulk particles and a precursor of element $M^1$ and subject the resulting mixture to a sintering treatment to form an element M-containing oxide coating layer on an exterior surface of the bulk particle, so as to obtain the positive electrode active material.

The precursor of element $M^1$ may be one or more of chloride, sulfate, nitrate, oxide, hydroxide, fluoride, carbonate, phosphate, dihydrogen phosphate, and organic compound of element $M^1$, but not limited thereto.

In step S40, a ball mill mixer or a high-speed mixer may be used to mix the materials. For example, the bulk particles and the precursor of element $M^1$ are added into a high-speed mixer for mixing. The mixing time ranges from 0.5 hours to 2 hours.

The mixed material is added into an atmosphere sintering furnace for sintering. The sintering atmosphere is an atmosphere containing oxygen, for example, an air or oxygen atmosphere. The sintering temperature ranges, for example, from 100° C. to 500° C., or for another example, from 200° C. to 450° C. The sintering time may range from 3 hours to 25 hours, for example, from 5 hours to 10 hours. Due to the lower sintering temperature, oxides of element $M^1$ are hardly diffused into the interior of the bulk particles, but forms a coating layer applied on the exterior surface of the bulk particle. The oxides of element $M^1$ are matched with the surface of the bulk particle, enabling the coating layer to be closely combined with the bulk particle, and the coating layer may hot damage the structure of the bulk particle, so that the coating layer reliably protects the bulk particle.

In some embodiments, the mixture in step S10 may include a precursor of an X element, so that the bulk phases of the bulk particles are doped with the X element. Alternatively, the mixture in step S30 may include a precursor of element X, so that the surface layer of the bulk particle is doped with element X. Further, a concentration of element X may show a concentration gradient decreasing from the exterior surface to the core of the bulk particle. Alternatively, the mixture in step S40 may include a precursor of element X, so that the coating layer is doped with element X. Types of the precursors containing element X are not specifically limited, and may be selected by those skilled in the art based on an actual need.

Positive Electrode Plate

This application provides a positive electrode plate, where the positive electrode plate uses any one or more positive electrode active materials in this application.

The positive electrode plate in this embodiment of this application uses the positive electrode active material in this application, thereby enabling a lithium-ion secondary battery using the positive electrode plate to have good high-temperature cycling performance and high-temperature storage performance and a relatively high energy density.

The positive electrode plate may include a positive electrode current collector and a positive electrode, active substance layer disposed on at least one surface of the positive electrode current collector. For example, the positive electrode current collector includes two opposite surfaces in thickness direction of the positive electrode current collector, and the positive electrode active substance layer is provided on either or both of the two surfaces of the positive electrode current collector.

The positive electrode active substance layer includes any one or more positive electrode active materials according to this application.

In addition, the positive electrode active substance layer may further include a conductive agent and a binder. Types of the conductive agent and binder in the positive electrode active substance layer are not specifically limited in this application, and may be selected as required.

In an example, the conductive agent may be one or more of graphite, superconducting carbon, acetylene black, carbon black, Ketjen black, carbon dots, carbon nanotube, graphene, and carbon nanofiber. The binder may be one or more of styrene-butadiene rubber (SBR), water-based acrylic resin (water-based acrylic resin), sodium carboxymethyl cellulose (CMC-Na), polyvinylidene fluoride (PVDF), polytetrafluoroethylene (PTFE), polyvinyl butyral (PVB), ethylene vinyl acetate copolymer (EVA), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, fluorine-containing acrylic resin, and polyvinyl alcohol (PVA).

The positive electrode current collector may use a metal foil material or a porous metal plate with good electrical conductivity and mechanical properties, for example, aluminum foil.

The positive electrode plate may be prepared by using a conventional method in the art. For example, the positive electrode active material, the conductive agent, and the binder are dispersed in a solvent which may be N-methylpyrrolidone (NMP), to obtain a uniform positive electrode slurry. The positive electrode slurry is applied on the positive current collector and undergoes processes such as drying by heat and rolling to obtain the positive electrode plate.

Lithium-Ion Secondary Battery

This application provides a lithium-ion secondary battery, where the lithium-ion battery includes a positive electrode plate, a negative electrode plate, a separator, and an electrolyte, and the positive electrode plate is any positive electrode plate in this application.

The lithium-ion secondary battery uses the positive electrode plate in this application, thereby having good high-temperature cycling performance and high-temperature storage performance and a relatively high energy density.

The negative electrode plate may be a metal lithium sheet.

The negative electrode plate may include a negative electrode current collector and a negative electrode active substance layer disposed on at least one surface of the negative electrode current collector. For example, the negative electrode current collector includes two opposite surfaces in thickness direction of the negative electrode current collector, and the negative electrode active substance layer is provided on either or both of the two surfaces of the negative electrode current collector.

The negative electrode active substance layer includes a negative electrode active material. The types of the negative electrode active material are not specifically limited in this application, and may be selected based on an actual need. In an example, the negative electrode active material may be one or more of natural graphite, artificial graphite, mesocarbon microbead (MCMB), hard carbon, soft carbon, silicon, a silicon-carbon composite, $SiO_m$ ($0<m<2$, for example, $m=1$), a Li—Sn alloy, a Li—Sn—O alloy, Sn, SnO, $SnO_2$, spinel-structure lithium titanate $Li_4Ti_5O_2$, a Li—Al alloy, and metal lithium.

The negative electrode active substance layer may further include a conductive agent and a binder. Types of the conductive agent and binder in the negative electrode active substance layer are not specifically limited in the embodiments of this application, and may be selected based on an actual requirement. In an example, the conductive agent is one or more of graphite, superconducting carbon, acetylene black, carbon black, Ketjen black, carbon dots, carbon nanotube, graphene, and carbon nanofiber; and the binder is one or more of styrene butadiene rubber (SBR), polyvinylidene fluoride (PVDF), polytetrafluoroethylene (PTFE), polyvinyl butyral (PVB), and water-based acrylic resin (water-based acrylic resin).

The negative electrode active substance layer further optionally includes a thickener, for example, sodium carboxymethyl cellulose (CMC-Na).

The negative electrode current collector may use a metal foil material or a porous metal plate with good electrical conductivity and mechanical properties, for example, copper foil.

The negative electrode plate may be prepared by using a conventional method in the art. For example, the negative electrode active material, the conductive agent, the binder, and the thickener are dispersed in a solvent which may be N-methylpyrrolidone (NMP) or deionized water, to obtain a uniform negative electrode slurry. The negative electrode slurry is applied on the negative current collector and undergoes processes such as drying by heat and rolling to obtain the negative electrode plate.

In the lithium-ion secondary battery of the embodiments of this application, the electrolyte may be a solid electrolyte, such as a polymer electrolyte or an inorganic solid electrolyte, but is not limited thereto. The electrolyte may alternatively be a liquid electrolyte. The foregoing liquid electrolyte may include a solvent and a lithium salt dissolved in the solvent.

The solvent may be a non-aqueous organic solvent, for example, one or more of ethylene carbonate (EC), propylene carbonate (PC), ethyl methyl carbonate (EMC), diethyl carbonate (DEC), dimethyl carbonate (DMC), diethyl carbonate (DEC), dipropyl carbonate (DPC), methyl propyl acetate (MPC), ethylene propyl carbonate (EPC), methyl formate (MF), methyl acetate (MA), ethyl acetate (EA), propyl acetate (PA), methyl propionate (MP), ethyl propionate (EP), propyl propionate (PP), methyl butyrate (MB), and ethyl butyrate (EB).

The lithium salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorophosphate), and LiTFOP (lithium tetrafluoro oxalate phosphate), for example, one or more of $LiPF_6$ (lithium hexafluorophosphate), $LiBF_4$ (lithium tetrafluoroborate), LiBOB (lithium bisoxalate), LiDFOB (lithium difluorooxalate), LiTFSI (lithium bistrifluoromethanesulfonimide), and LiFSI (lithium bisfluorosulfonimide).

The liquid electrolyte further optionally includes other additives, for example, one or more of vinylene carbonate (VC), vinyl ethylene carbonate (VEC), fluoroethylene carbonate (FEC), difluoroethylene carbonate (DFEC), trifluoromethyl ethylene carbonate (TFPC), succinonitrile (SN), adiponitrile (ADN), glutaronitrile (GLN), hexanetrinitrile (HTN), 1,3-propane sultone (1,3-PS), ethylene sulfate (DTD), methylene methane disulfonate (MMDS), 1-propene-1,3-sultone (PST), 4-methyl ethylene sulfate (PCS), 4-ethyl ethylene sulfate (PES), 4-propyl ethylene sulfate (PEGLST), propylene sulfate (TS), 1,4-butane sultone (1,4-BS), ethylene sulfite (DTO), dimethyl sulfite (DMS), diethyl sulfite (DES), sulfonate cyclic quaternary ammonium salt, tris(trimethylsilane) phosphate (TMSP), and tris(trimethylsilane) boron esters (TMSB), but is not limited thereto.

The separator is not particularly limited in the lithium-ion secondary battery of the embodiments of this application, and any well-known porous separators with electrochemical and mechanical stability may be selected, for example, a mono-layer or multi-layer membrane including one or more of glass fiber, non-woven fabric, polyethylene (PE), polypropylene (PP), and polyvinylidene fluoride (PVDF).

The positive electrode plate and the negative electrode plate are alternately stacked with a separator disposed between the positive electrode plate and the negative electrode plate for separation, to obtain a cell, or to obtain a cell after winding. The cell is placed into an outer package, the liquid electrolyte is injected, and the package is then sealed, so that a lithium-ion secondary battery is obtained.

Figure 3:
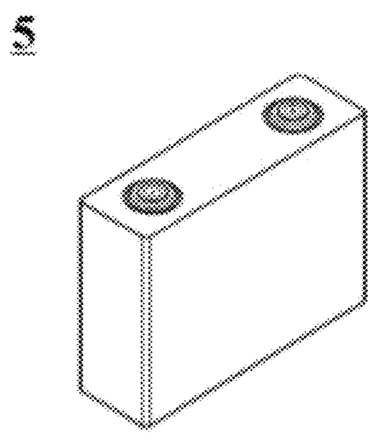
FIG. 3 is a schematic diagram of an embodiment of a lithium-ion secondary battery.

The shape of the lithium-ion secondary battery is not particularly limited in this application, which may be of a cylindrical shape, a square shape, or any other shape. FIG. 3 shows a lithium-ion secondary battery 5 of a square structure as an example.

In some embodiments, the secondary battery may include an outer package. The outer package is used for encapsulating the positive electrode plate, the negative electrode plate, and the electrolyte.

Figure 4:
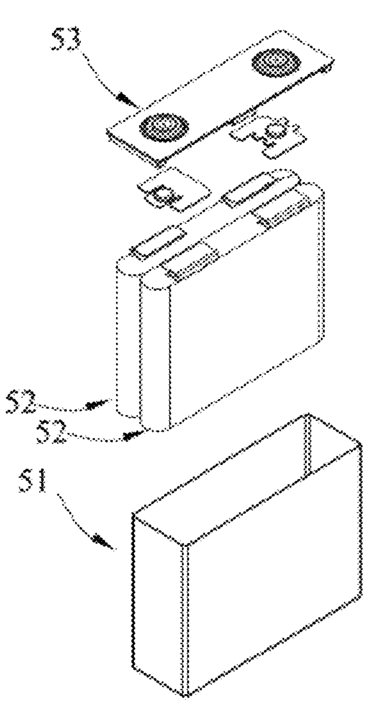
FIG. 4 is an exploded diagram of FIG. 3.

In some embodiments, as shown in FIG. 4, the outer package may include a housing 51 and a cover plate 53. The housing 51 may include a bottom plate and side plates connected to the bottom plate, and the bottom plate and side plates enclose to form an accommodating cavity. The housing 51 has an opening communicating with the accommodating cavity, and the cover plate 53 can cover the opening to close the accommodating cavity.

The positive electrode plate, the negative electrode plate, and the separator may be wound or laminated to form a cell 52. The cell 52 is encapsulated in the accommodating cavity. The electrolyte may be a liquid electrolyte infiltrated in the cell 52. There may be one or more cells 52 in the lithium-ion secondary battery 5, and their quantity may be adjusted as required.

In some embodiments, the outer package of the lithium-ion secondary battery may be a hard shell, for example, a hard plastic shell, an aluminum shell, or a steel shell. The outer package of the lithium-ion secondary battery may alternatively be a soft package, for example, a soft bag. A material of the soft package may be plastic, for example, may include one or more of polypropylene (PP), polybutylene terephthalate (PBT), polybutylene succinate (PBS), and the like.

In some embodiments, lithium-ion secondary batteries may be assembled into a battery module, and a battery module may include a plurality of lithium-ion secondary batteries. The specific quantity may be adjusted according to the use case and capacity of the battery module.

Figure 5:
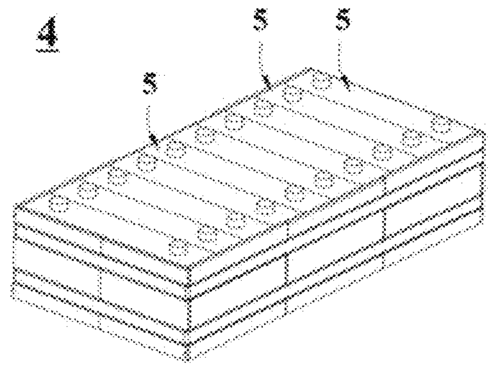
FIG. 5 is a schematic diagram of an embodiment of a battery module.

FIG. 5 shows a battery module 4 as an example. As shown in FIG. 5, in the battery module 4, a plurality of lithium-ion secondary batteries 5 may be sequentially arranged in a length direction of the battery module 4. Certainly, the plurality of lithium-ion secondary batteries may be arranged in any other manner. Further, the plurality of lithium-ion secondary batteries 5 may be fixed by using fasteners.

Optionally, the battery module 4 may further include an enclosure with an accommodating space, and the plurality of lithium-ion secondary batteries 5 are accommodated in the accommodating space.

In some embodiments, battery modules may be further assembled into a battery pack, and a quantity of battery modules included in the battery pack may be adjusted based on application and capacity of the battery pack.

Figure 6:
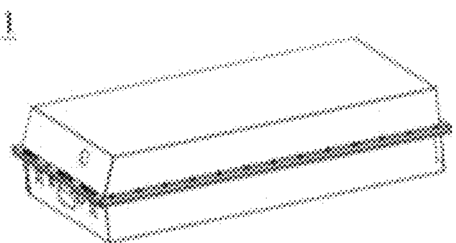
FIG. 6 is a schematic diagram of an embodiment of a battery pack.
Figure 7:
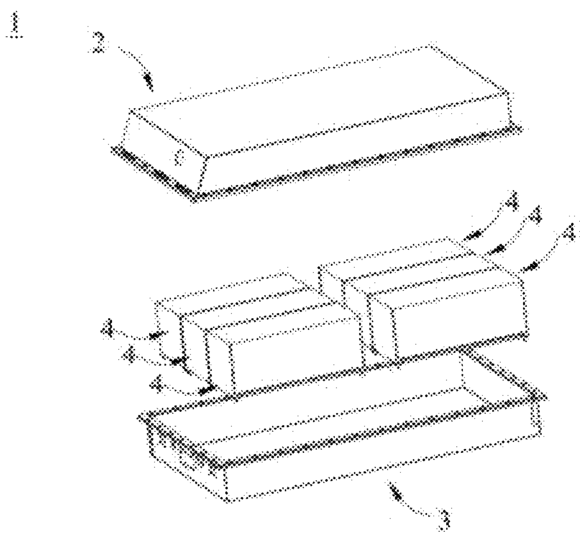
FIG. 7 is an exploded diagram of FIG. 6.

FIG. 6 and FIG. 7 show a battery pack 1 as an example. Referring to FIG. 6 and FIG. 7, the battery pack 1 may include a battery box and a plurality of battery modules 4 disposed in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

This application further provides an apparatus, including at least one of the lithium-ion secondary battery, battery module, or battery pack of this application. The lithium-ion secondary battery, battery module, or battery pack may be used as a power source for the apparatus, or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A lithium-ion secondary battery, a battery module, or a battery pack may be selected for the apparatus according to requirements for using the apparatus.

Figure 8:
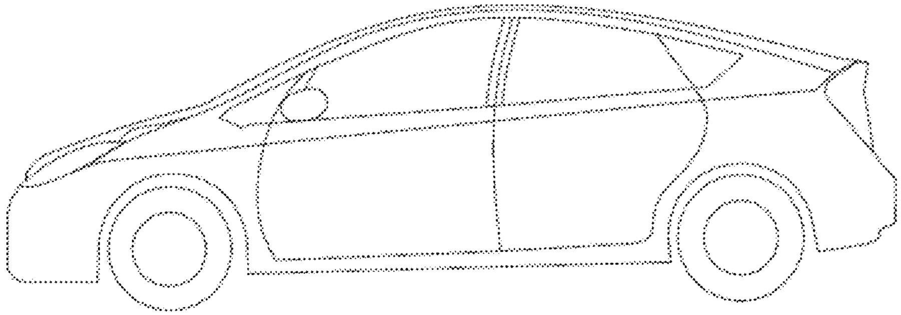
FIG. 8 is a schematic diagram of an embodiment of an apparatus using a lithium-ion secondary battery as a power source.

FIG. 8 shows an apparatus as an example. The apparatus is a battery electric vehicle, a hybrid electric vehicle, a plug-in hybrid electric vehicle, or the like. To meet a requirement of the apparatus for high power and a high energy density of a secondary battery, a battery pack or a battery module may be used.

In another example, the apparatus may be a mobile phone, a tablet computer, a notebook computer, or the like. The apparatus is generally required to be light and thin, and may use a lithium-ion secondary battery as its power source.

EXAMPLES

The following examples describe in more detail content disclosed in this application. These examples are intended only for illustrative purposes because various modifications and changes made without departing from the scope of the content disclosed in this application are apparent to those skilled in the art. Unless otherwise stated, all parts, percentages, and ratios reported in the following examples are based on weights, all reagents used in the examples are commercially available or synthesized in a conventional manner, and can be used directly without further processing, and all instruments used in the examples are commercially available.

Example 1

Preparation of a Positive Electrode Active Material (1) A precursor $[Ni_{0.8}Co_{0.1}Mn_{0.1}](OH)_2$ of the positive electrode active material, lithium hydroxide LiOH, antimony trioxide $Sb_2O_3$, and antimony trioxide $Sb_2O_5$ were added to a high speed mixer for mixing for 1 hour to obtain a mixture, where a molar ratio Li/Me of the precursor of the positive electrode active material to lithium hydroxide was 1.05, and Me represents a total number of moles of Ni, Co, and Mn in the positive electrode active material. The number of moles of $Sb_2O_3$ was 50% of the total number of moles of $Sb_2O_3$ and $Sb_2O_5$, and an added amount of $Sb_2O_3$ and $Sb_2O_5$ made a concentration of Sb in the positive electrode active material to be 3120 ppm. The mixture was placed into the atmosphere sintering furnace for sintering at 830° C., the sintering atmosphere was an atmosphere containing oxygen with an $O_2$ concentration of 90%, and the sintering duration was 15 hours, so that the matrix particles were obtained after the mixture was crushed and sieved. Sb was uniformly doped in the bulk phase structure of the matrix particles.

(2) The matrix particles and aluminum oxide $Al_2O_3$ were added into the high-speed mixer for mixing for 1 hour. An added amount of $Al_2O_3$ made a concentration of Al in an exterior doped layer of the bulk particle to be 2210 ppm, and the concentration refers to a concentration in the positive electrode active material. The mixed materials were placed into the atmosphere sintering furnace for sintering at 700° C., the sintering atmosphere was an atmosphere containing oxygen with an 02 concentration of 90%, and the sintering duration was 15 hours, so that Al was doped into the surface layer of the matrix particle to form the exterior doped layer, and the bulk particles were obtained. The thickness of the exterior doped layer was 21% of the particle size of the bulk particle. Element Al in the exterior doped layer showed a concentration gradient decreasing gradually from the exterior surface to the core of the bulk particle.

(3) The bulk particles and aluminum oxide $Al_2O_3$ were added into the high-speed mixer for mixing for 1 hour. An added amount of $Al_2O_3$ made a concentration of Al in the coating layer to be 1207 ppm, and the concentration refers to a concentration of Al in the positive electrode active material. The mixed materials were placed into the atmosphere sintering furnace for sintering at 450° C., the sintering atmosphere was an atmosphere containing oxygen with an $O_2$ concentration of 90%, and the sintering duration was 14 hours, to enable an $Al_2O_3$ coating layer to be formed on the exterior surface of the bulk particle, so that the positive electrode active material was obtained. The thickness of the coating layer was 98 nm.

Preparing an Electrolyte

EC, DEC, and DMC were mixed at a volume ratio of 1:1:1 to obtain a solvent, and a lithium salt $LiPF_6$ was dissolved into the solvent to obtain an electrolyte, where a concentration of $LiPF_6$ was 1 mol/L.

Preparation of a Button Battery

The positive electrode active material prepared in the foregoing, conductive carbon black, and a binder PVDF were dispersed at a weight ratio of 90:5:5 into a solvent N-methylpyrrolidone (NMP) and stirred well to obtained a positive electrode slurry. The positive electrode slurry was applied uniformly on a positive electrode current collector aluminum foil, and a positive electrode plate was obtained after processes such as drying and cold pressing were performed.

In a button box, the positive electrode plate, the separator, and metal lithium sheet were stacked in sequence, the foregoing electrolyte was injected, and a button battery was obtained through assembly.

Preparation of a Full Battery

The positive electrode active material prepared in the foregoing, a conductive agent acetylene black, and a binder PVDF were dispersed at a weight ratio of 94:3:3 into a solvent NMP and stirred well to obtained a positive electrode slurry. The positive electrode slurry was applied uniformly on a positive electrode current collector aluminum foil, and after processes such as drying and cold pressing were performed, a positive electrode plate was obtained.

A negative electrode active material artificial graphite, hard carbon, a conductive agent acetylene black, a binder styrene-butadiene rubber (SBR), and a thickener sodium carboxymethyl cellulose (CMC) were dispersed at a weight ratio of 90:5:2:2:1 into deionized water and mixed well to obtain a negative electrode slurry. The negative electrode slurry was applied uniformly on a negative electrode current collector copper foil, and after processes such as drying and cold pressing were performed, a negative electrode plate was obtained.

A polyethylene (PE) porous polymer film was used as a separator. The positive electrode plate, the separator, and the negative electrode plate were stacked in sequence to obtain a bare cell, the bare cell was placed into an outer package, the electrolyte was injected, and the package was sealed. After processes such as formation were performed, a full battery was obtained.

Examples 2 to 28 and Comparative Examples 1 to 9

A difference from Example 1 was that the relevant parameters in the preparation steps of the positive electrode active material were changed to obtain the positive electrode active material with predetermined parameter characteristics. For details, refer to Table 1-1 and Table 1-2.

Precursors of the positive electrode active materials in Examples 2 to 26 and Comparative Examples 1 to 4 were all $[Ni_{0.8}Co_{0.1}Mn_{0.1}](OH)_2$. Precursors of the positive electrode active materials in Example 27 and Comparative Examples 5 to 8 were all $[Ni_{0.6}Co_{0.2}Mn_{0.2}](OH)_2$. Precursors of the positive electrode active materials in Example 28 and Comparative Example 9 were both $[Ni_{0.5}Co_{0.2}Mn_{0.3}(OH)_2$.

Precursors of doping element in Example 3 and Examples 24 to 26 were $WO_2$ and $WO_3$. Precursors of doping element in Example 4 were SiO and $SiO_2$. Precursors of doping element in Example 5 and Examples 19 to 21 were $NbO_2$ and $Nb_2O_5$. Precursors of doping element in Example 6 and Examples 22 to 23 were $V_2O_3$ and $V_2O_4$. Precursors of doping element in Example 7 were $TeO_2$ and $TeO_3$. Precursors of doping element in Example 8 were $MoO_2$ and $MoO_3$. Precursors of doping element in Example 9 were $Sb_2O_3$, $Sb_2O_5$, $WO_2$, and $WO_3$, and the four precursors had basically the same amount.

The other precursors of the doping element $M^3$ and the coating element $M^1$ that were different from those in Example 1 were selected from CaO, $TiO_2$, $B_2O_3$, MgO, and $ZrO_2$.

In Example 20, the sintering temperature was 720° C. and the sintering duration was 8 hours in step (1); the sintering temperature was 600° C. and the sintering duration was 10 hours in step (2); and the sintering temperature was 380° C. and the sintering duration was 11 hours in step (3).

In Example 21, the sintering temperature was 650° C. and the sintering duration was 4 hours in step (1); the sintering temperature was 570° C. and the sintering duration was 6 hours in step (2); and the sintering temperature was 260° C. and the sintering duration was 8 hours in step (3).

In Example 22, the sintering temperature was 710° C. and the sintering duration was 7 hours in step (1); the sintering temperature was 520° C. and the sintering duration was 9 hours in step (2); and the sintering temperature was 210° C. and the sintering duration was 6 hours in step (3).

In Example 23, the sintering temperature was 600° C. and the sintering duration was 4 hours in step (1); the sintering temperature was 440° C. and the sintering duration was 3 hours in step (2); and the sintering temperature was 120° C. and the sintering duration was 3 hours in step (3).

In Example 27 and Comparative Examples 5 to 8, the sintering temperature was 800° C. and the sintering duration was 14 hours in step (1); the sintering temperature was 700° C. and the sintering duration was 13 hours in step (2); and the sintering temperature was 450° C. and the sintering duration was 11 hours in step (3).

In Example 28 and Comparative Example 9, the sintering temperature was 780° C. and the sintering duration was 13 hours in step (1); the sintering temperature was 700° C. and the sintering duration was 12 hours in step (2); and the sintering temperature was 450° C. and the sintering duration was 10 hours in step (3).

No element $M^2$ was doped in Comparative Example 1 and Comparative Example 5, no element $M^3$ was doped in Comparative Example 2 and Comparative Example 6, no element $M^1$ was doped in Comparative Example 3 and Comparative Example 7, and no doping and coating were performed in Comparative Example 4 and Comparative Examples 8 to 9.

The other parameters are shown in Table 1-1 and Table 1-2.

In Table 1-1 and Table 1-2, "Valence state of $M^2$ in 78% delithiated state" is the lowest valence and the highest valence of element $M^2$ in a 78% delithiated state of the listed positive electrode active material. $\sigma$ represents the relative deviation of the local mass concentration of element $M^2$ in the bulk particles. The thickness percentage of the exterior doped layer is the percentage of the thickness of the exterior doped layer to the particle size of the bulk particle. $\kappa$ represents a ratio of a sum of the concentration of element $M^1$ and the concentration of element $M^3$ in the positive electrode active material to a volume average particle size $D_v50$ of the positive electrode active material, in ppm/μm. The concentrations of element $M^1$, element $M^2$, and element $M^3$ all refer to concentrations in the positive electrode active material.

Test (1) Test for Valence Distribution of Element $M^2$ in the Positive Electrode Active Material in a "78% Delithiated State".

a. Determine a 78% Delithiated State

Eight button batteries were charged at 25° C. at a constant current of 1 C to the upper limit of the charge/discharge cut-off voltages, then charged at a constant voltage to a current less than or equal to 0.05 mA, after that, left standing for 2 minutes, and then discharged at a constant current of 1 C to the lower limit of the charge/discharge cut-off voltages.

After that, the forgoing charged and discharged eight button batteries were charged to 4.0V, 4.1V, 4.2V, 4.3V, 4.4V, 4.5V, 4.6V, 4.7V at a rate of 0.1 C, respectively. Each charged button battery was taken and disassembled in a drying room to obtain a positive electrode plate as a sample. After the mass of the sample was weighed and recorded, the sample was placed into a digestion tank, and 10 mL of aqua regia as a digestion reagent was slowly added. The tank was closed and placed into the CEM-Mars5 microwave digestion instrument, and digestion was carried out at a microwave emission frequency of 2450 Hz. The digested sample solution was transferred to a volumetric flask, shook well, and sampled. The sampled solution was placed into the 7000DV inductively coupled plasma-emission spectrometer (ICP-OES) sample introduction system from PE company in USA, then mass concentration tests for Li, O, Ni, Co, Mn and the doping element were performed on the positive electrode active material at 0.6 MPa argon pressure and 1300 W radio frequency power. Chemical formulas at each voltage were obtained through conversion based on the mass concentration of each element, and then delithiated states at each voltage were obtained. For example, if the chemical formula of the positive electrode active material obtained through conversion at a voltage of 4.3V was $Li_{0.22}Ni_{0.8}Co_{0.1}Mn_{0.1}O_2$, the corresponding delithiated state was $(1-0.22)\times100\%=78\%$ delithiated state, to be specific, the battery voltage corresponding to the 78% delithiated state was 4.3V.

The button batteries were respectively charged at 25° C. at a rate of 0.1 C to voltages corresponding to the 78% delithiated state to obtain samples with the 78% delithiated state, and then the following operations were performed.

b. Valence State Determined by Using XPS (i) The battery cell in the 78% delithiated state was dissembled in a drying room to take out the whole positive electrode plate, the positive electrode plate was placed into a beaker, and an appropriate amount of high-purity anhydrous dimethyl carbonate DMC was added into the beaker. The DMC was changed every 8 hours, the positive electrode plate was consecutively washed for 3 times, and then placed into a vacuum standing box in the drying room. The vacuum standing box was vacuumized to a vacuum state (−0.096 MPa), and the positive electrode plate was dried for 12 hours. The dried positive electrode plate was scraped and ground in a drying room with a blade, and approximately 50 mg of the positive electrode active material powder was weighed and taken.

(ii) The surface of a piece of aluminum foil of approximately 2 cm×2 cm was wiped clean with acetone, a double-sided tape of approximately 1 cm×1 cm was cut out and stuck on the center of the aluminum foil, the powder sample was spread on the double-sided tape, evenly spreading across the entire double-sided tape with a clean stainless steel sampling spoon. Another piece of aluminum foil was taken and wiped clean with acetone to cover the sample, and the entire piece was placed between two flat stainless steel modules, and then pressed by using a tablet press at a pressure of about 10 MPa for 15 seconds.

(iii) The pressed sample was placed into the sample chamber of the escalab 250Xi X-ray photoelectron spectrometer from Thermo Fisher Scientific (Thermo) in USA, and a monochromatic Al Kα (hv=1486.6 eV) excitation source, X-ray power of 150 W, and a focusing spot 500 m were set. 2p or 3d spectrum of the doping element was collected for peak fitting with XPSpeak software to determine the valence distribution of element $M^2$.

Figure 2:
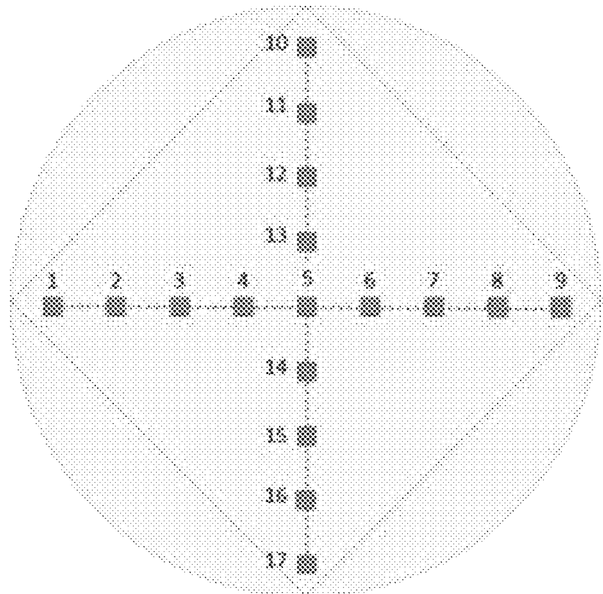
FIG. 2 is a schematic diagram of point sampling locations in relative deviation tests of local doped mass concentration of element $M^2$ of bulk particles in Examples 1 to 28 and Comparative Examples 1 to 9.

(2) Test for Relative Deviation of Local Mass Concentration of Element $M^2$ in the Bulk Particles 2 g of the positive electrode active material powder sample was weighed and taken, evenly sprinkled on the sample stage with conductive adhesive, and then lightly pressed to fix the powder. Alternatively, a 1 cm×1 cm electrode plate was cut out from the battery positive electrode plate and stuck on the sample stage as a sample to be tested. The sample stage was loaded into the vacuum sample chamber and fixed, and the IB-09010CP cross-section polisher from the electronic company JEOL in Japan was used to prepare a cross section of the particle of the positive electrode active material, that is, to obtain the cross-section of the bulk particle, as shown in FIG. 2. Points were taken with reference to 17 sites of the particle cross-section shown in FIG. 2, with an area 20 nm×20 nm of each point. The X-Max energy dispersive spectrometer (EDS) from Oxford Instruments Group in UK was used together with Sigma-02-33 scanning electron microscope (SEM) from ZEISS in German to test the mass concentration of the doping element at the 17 sites. The test method was as follows: Li, O, Ni, Co, Mn and the doping element were selected as elements to be tested, the SEM parameters of a 20 kV acceleration voltage, a 60 μm diaphragm, a 8.5 mm working distance, and a 2.335 A current were set, and the EDS test stopped when the spectrum area reached 250,000 cts (controlled by the acquisition time and acquisition rate), data was collected, and the mass concentration of element $M^2$ at the sites were obtained and denoted respectively as $\eta_1, \eta_2, \eta_3, \ldots, \eta_{17}$.

The method for determining the average mass concentration $\overline{\eta}$ of element $M^2$ in the bulk particle was as follows: The foregoing EDS-SEM test method was used, and as shown in a dashed box in FIG. 2, a test area covered all the scanned points of the foregoing bulk particle, and did not exceed the cross-section of the bulk particle.

After that, the relative deviation σ of local mass concentration of element $M^2$ in the bulk particles is calculated according to the equation (1).

(3) Concentrations of Element $M^1$, Element $M^2$, Element $M^3$ in the Positive Electrode Active Material The 7000DV inductively coupled plasma-optical emission spectrometer (ICP-OES) from PE company in USA was used to test concentrations of elements $M^1$, $M^2$, and $M^3$ in the positive electrode active material. The test method was as follows: The electrode plate containing the positive electrode active material was taken and die cut into a disc with total mass greater than 0.5 g or at least 5 g of the positive electrode active material powder sample was weighed, recorded, and placed into a digestion tank. 10 mL of aqua regia as a digestion reagent was slowly added. After that, the sample was placed into the Mars5 microwave digestion apparatus from CEM company in USA, and digestion was carried out at a microwave emission frequency of 2450 Hz. The digested sample solution was transferred to a volumetric flask, shook well, and sampled. The sampled solution was placed into the ICP-OES sample introduction system, and concentrations of elements $M^1$, $M^2$, and $M^3$ in the positive electrode active material was tested at 0.6 MPa argon pressure and 1300 W radio frequency power.

After that, a deviation of the concentration of element $M^2$ in the positive electrode active material with respect to the average mass concentration of element $M^2$ in the bulk particles was calculated according to above described equation (2).

(4) Test for Initial Gram Capacity of the Button Battery

The button battery was charged at 25° C. at a constant current of 0.1 C to the upper limit of the charge/discharge cut-off voltages, then charged at a constant voltage to a current less than or equal to 0.05 mA, after that, left standing for 2 minutes, and then discharged at a constant current of 0.1 C to the lower limit of the charge/discharge cut-off voltages. The discharge capacity in this case was the initial gram capacity of the button battery.

(5) Initial Gram Capacity Test of the Full Battery

The battery was charged at 25° C. at a constant current of ⅓ C to the upper limit of the charge/discharge cut-off voltages, then charged at a constant voltage to a current less than or equal to 0.05 mA, after that, left standing for 5 minutes, and then discharged at a constant current of ⅓ C to the lower limit of the charge/discharge cut-off voltages. The discharge capacity in this case was the initial gram capacity of the full battery.

(6) Test for High-Temperature Cycling Performance of the Full Battery

The battery was charged at 45° C. at a constant current of 1 C to the upper limit of the charge/discharge cut-off voltages, then charged at a constant voltage to a current less than or equal to 0.05 mA, after that, left standing for 5 minutes, and then discharged at a constant current of 1 C to the lower limit of the charge/discharge cut-off voltages. This was one charge-discharge cycle. The discharge capacity in this case was recorded as the discharge specific capacity $D_1$ at the first cycle. Charge-discharge testing was performed for the battery for 400 cycles according to the foregoing method, and a discharge specific capacity $D_{400}$ at the $4^{th}$ cycle was recorded.

Capacity retention rate (%) of full battery after 400 cycles at 45° C. and 1 C/1 $C=D_{400}/D_1\times100\%$ (7) Test for High-Temperature Storage Performance of the Full Battery The battery was charged at 25° C. at a constant current rate of 1 C to the upper limit of the charge/discharge cut-off voltages, then charged at a constant voltage to a current less than or equal to 0.05 mA, and a thickness of the battery at that point was measured and recorded as $V^0$. Then the battery was placed into a constant-temperature box at 80° C. for storage for 10 days, and a volume of the battery after storage was measured and recorded as $V_1$. In this test, the drainage method was used to test the volume of the battery.

Volume swelling rate ΔV (%) of the full battery after storage at 80° C. for 10 days$=(V_1-V_0)/V_0\times100\%$ In the tests (1), (4), and (7), In Examples 1 to 26 and Comparative Examples 1 to 4, the cut-off voltage of the button battery ranged from 2.8V to 4.25V, and the cut-off voltage of the full battery ranged from 2.8V to 4.2V.

In Examples 27 to 28 and Comparative Examples 5 to 9, the cut-off voltage of the button battery ranged from 2.8V to 4.35V, and the cut-off voltage of the full battery ranged from 2.8V to 4.3V.

Test results of Examples 1 to 28 and Comparative Examples 1 to 9 are shown in Table 2.

TABLE 1-1

| Number | Element $M^2$ Type | Valence state of $M^2$ in 78% | Concentration | σ (%) | ε (%) | Element $M^3$ Type | Concentration (ppm) | Thickness percentage of exterior doped layer | Element $M^1$ Type | Concentration | Thickness of coating layer (nm) | κ | Specific surface area ($m^2/g$) | Tap density ($g/cm^3$) |
|---|---|---|---|---|---|---|---|---|---|---|---|---|---|---|
| Example 1 | Sb | +3, +5 | 3120 | 8 | 9 | Al | 2210 | 21 | Al | 1207 | 98 | 495 | 0.6 | 2.5 |
| Example 2 | Sb | +3, +5 | 3150 | 9 | 11 | Al | 2190 | 20 | B | 1195 | 102 | 501 | 0.7 | 2.4 |
| Example 3 | W | +6 | 3100 | 7 | 10 | Al | 2235 | 19 | Al | 1254 | 100 | 497 | 0.5 | 2.6 |
| Example 4 | Si | +4 | 3170 | 11 | 8 | Ca | 2224 | 22 | B | 1234 | 99 | 503 | 0.8 | 2.5 |
| Example 5 | Nb | +4, +5 | 3150 | 12 | 12 | Ti | 2209 | 20 | Ti | 1274 | 104 | 508 | 0.6 | 2.4 |
| Example 6 | V | +4, +5 | 3120 | 13 | 13 | B | 2241 | 21 | B | 1188 | 105 | 489 | 0.7 | 2.7 |
| Example 7 | Tc | +4, +6 | 3080 | 6 | 10 | Mg | 2187 | 19 | Zr | 1201 | 107 | 492 | 0.7 | 2.5 |
| Example 8 | Mo | +4, +6 | 3090 | 10 | 11 | Zr | 2203 | 23 | Zr | 1227 | 99 | 501 | 0.6 | 2.4 |
| Example 9 | Sb + W | +3, +6 | 3120 | 12 | 9 | Al | 2218 | 22 | Al | 1215 | 101 | 512 | 0.8 | 2.6 |
| Example 10 | Sb | +3, +5 | 500 | 6 | 7 | Al | 2023 | 20 | Al | 1203 | 120 | 527 | 0.6 | 2.5 |
| Example 11 | Sb | +3, +5 | 1092 | 8 | 12 | Al | 2018 | 19 | Al | 1196 | 119 | 505 | 0.5 | 2.6 |
| Example 12 | Sb | +3, +5 | 2034 | 7 | 10 | Al | 2103 | 21 | Al | 1215 | 121 | 498 | 0.7 | 2.6 |
| Example 13 | Sb | +3, +5 | 5000 | 9 | 11 | Al | 1985 | 20 | Al | 1207 | 124 | 531 | 0.8 | 2.5 |
| Example 14 | Sb | +3, +5 | 7000 | 9 | 12 | Al | 2007 | 20 | Al | 1189 | 122 | 514 | 0.6 | 2.7 |
| Example 15 | Sb | +3, +5 | 3028 | 8 | 8 | Al | 400 | 19 | Al | 1205 | 118 | 134 | 0.6 | 2.5 |
| Example 16 | Sb | +3, +5 | 3114 | 10 | 9 | Al | 3000 | 21 | Al | 1220 | 120 | 931 | 0.5 | 2.8 |
| Example 17 | Sb | +3, +5 | 2976 | 12 | 13 | Al | 2031 | 22 | Al | 100 | 121 | 148 | 0.7 | 2.6 |
| Example 18 | Sb | +3, +5 | 3067 | 9 | 15 | Al | 1984 | 20 | Al | 2000 | 120 | 913 | 0.6 | 2.5 |

TABLE 1-2

| Number | Element $M^2$ Type | Valence state of $M^2$ in 78% | Concentration (ppm) | σ (%) | ε (%) | Element $M^3$ Type | Concentration (ppm) | Thickness percentage of exterior doped layer | Element $M^1$ Type | Concentration (ppm) | Thickness of coating layer (nm) | κ | Specific surface area ($m^2/g$) | Tap density ($g/cm^3$) |
|---|---|---|---|---|---|---|---|---|---|---|---|---|---|---|
| Example 19 | Nb | +4, +5 | 3011 | 13 | 10 | Al | 2005 | 20 | Al | 1201 | 85 | 524 | 0.5 | 2.6 |
| Example 20 | Nb | +4, +5 | 2997 | 20 | 9 | Al | 1997 | 19 | Al | 1,198 | 83 | 519 | 0.6 | 2.5 |
| Example 21 | Nb | +4, +5 | 3084 | 35 | 12 | Al | 2014 | 21 | Al | 1217 | 86 | 531 | 0.7 | 2.7 |
| Example 22 | V | +4, +5 | 3110 | 16 | 30 | B | 2211 | 17 | B | 1190 | 98 | 526 | 0.5 | 2.5 |
| Example 23 | V | +4, +5 | 3105 | 18 | 49 | B | 2198 | 15 | B | 1200 | 95 | 529 | 0.6 | 2.6 |
| Example 24 | W | +6 | 2985 | 8 | 10 | Al | 2001 | 5 | Al | 1231 | 99 | 492 | 0.5 | 2.6 |
| Example 25 | W | +6 | 3021 | 11 | 9 | Al | 1989 | 41 | Al | 1196 | 102 | 523 | 0.5 | 2.5 |
| Example 26 | W | +6 | 3017 | 12 | 8 | Al | 2052 | 20 | Al | 1205 | 243 | 541 | 0.8 | 2.4 |
| Comparative Example 1 | / | / | / | / | / | Al | 2230 | 24 | Al | 1222 | 96 | 487 | 0.9 | 2.7 |
| Comparative Example 2 | Sb | +3, +5 | 3120 | 8 | 9 | / | / | / | Al | 1208 | 102 | 479 | 0.5 | 2.7 |
| Comparative Example 3 | Sb | +3, +5 | 3120 | 8 | 8 | Al | 2198 | 20 | / | / | / | 486 | 0.6 | 2.5 |
| Comparative Example 4 | / | / | / | / | / | / | / | / | / | / | / | / | 0.7 | 2.6 |
| Example 27 | Sb | +3, +5 | 3005 | 8 | 9 | Al | 2034 | 19 | Al | 1195 | 112 | 514 | 0.6 | 2.5 |
| Comparative Example 5 | / | / | / | / | / | Al | 2014 | 20 | Al | 1207 | 104 | 517 | 0.6 | 2.6 |
| Comparative Example 6 | Sb | +3, +5 | 3007 | 9 | 8 | / | / | / | Al | 1205 | 109 | 423 | 0.7 | 2.5 |
| Comparative Example 7 | Sb | +3, +5 | 3021 | 11 | 10 | Al | 1994 | 22 | / | / | / | 412 | 0.7 | 2.6 |
| Comparative Example 8 | / | / | / | / | / | / | / | / | / | / | / | / | 0.7 | 2.5 |
| Example 28 | Sb | +3, +5 | 2999 | 6 | 8 | Al | 2001 | 21 | Al | 1217 | 108 | 523 | 0.7 | 2.6 |
| Comparative Example 9 | / | / | / | / | / | / | / | / | / | / | / | / | 0.6 | 2.5 |

TABLE 2

| Number | Initial gram capacity of button battery (mAh/g) | Initial gram capacity of full battery (mAh/g) | Cycling capacity retention rate of full battery (%) | Volume swelling rate of full battery (%) |
|---|---|---|---|---|
| Example 1 | 207.2 | 197.3 | 93.04 | 3.5 |
| Example 2 | 206.8 | 195.7 | 91.83 | 5.9 |
| Example 3 | 205.7 | 195.2 | 92.57 | 4.1 |
| Example 4 | 206.3 | 196.2 | 91.62 | 6.1 |
| Example 5 | 204.9 | 195.1 | 92.84 | 4.5 |
| Example 6 | 205.2 | 196.4 | 92.16 | 4.6 |
| Example 7 | 207.1 | 196.8 | 91.83 | 7.5 |
| Example 8 | 206.5 | 195.7 | 92.76 | 4.3 |
| Example 9 | 207.1 | 197.1 | 92.92 | 3.9 |
| Example 10 | 202.7 | 192.9 | 86.21 | 25.7 |
| Example 11 | 204.1 | 194.2 | 88.53 | 22.9 |
| Example 12 | 206.2 | 195.7 | 89.71 | 20.1 |
| Example 13 | 205.1 | 194.2 | 87.62 | 26.4 |
| Example 14 | 201.3 | 190.5 | 85.94 | 31.8 |
| Example 15 | 206.7 | 195.2 | 90.39 | 28.3 |
| Example 16 | 205.8 | 194.3 | 89.28 | 24.5 |
| Example 17 | 206.4 | 196.5 | 90.45 | 29.1 |
| Example 18 | 204.1 | 193.8 | 85.71 | 19.2 |
| Example 19 | 205.7 | 195.4 | 92.34 | 6.8 |
| Example 20 | 201.3 | 190.9 | 87.42 | 23.1 |
| Example 21 | 200.5 | 190.2 | 85.97 | 32.4 |
| Example 22 | 204.2 | 195.3 | 90.76 | 19.4 |
| Example 23 | 202.8 | 193.1 | 88.07 | 25.1 |
| Example 24 | 205.5 | 195.4 | 88.23 | 30.6 |
| Example 25 | 203.8 | 193.5 | 86.37 | 23.1 |
| Example 26 | 202.4 | 192.1 | 84.74 | 22.8 |
| Comparative Example 1 | 197.6 | 187.2 | 82.37 | 28.5 |
| Comparative Example 2 | 199.8 | 188.7 | 85.24 | 33.2 |
| Comparative Example 3 | 200.2 | 189.3 | 84.91 | 36.4 |
| Comparative Example 4 | 198.1 | 187.4 | 81.02 | 60.1 |
| Example 27 | 179.5 | 174.8 | 93.61 | 5.8 |
| Comparative Example 5 | 170.6 | 165.4 | 85.12 | 18.9 |
| Comparative Example 6 | 178.4 | 173.9 | 89.47 | 14.3 |
| Comparative Example 7 | 179.1 | 174.2 | 89.54 | 15.7 |
| Comparative Example 8 | 167.8 | 162.4 | 82.47 | 41.9 |
| Example 28 | 176.1 | 172.3 | 94.25 | 3.2 |
| Comparative Example 9 | 165.3 | 160.5 | 83.51 | 36.3 |

It can be seen from Examples 1 to 28 and Comparative Examples 1 to 9 that, by enabling the bulk phases of the nickel-containing lithium composite oxide bulk particles to be uniformly doped with element $M^2$, the surface layer of the bulk particle to be doped with element $M^3$, the exterior surface of the bulk particle to have an element $M^1$-containing oxide coating layer, and element $M^1$, $M^2$ element, and element $M^3$ each to be selected from specific element types, the lithium-ion secondary battery not only has a relatively high initial gram capacity, but also has relatively high high-temperature cycling performance and high-temperature storage performance.

It can be seen from comparison among Examples 19 to 21 that, by reducing the relative deviation of local mass concentration of element $M^2$ in the bulk particles of the positive electrode active material to control the deviation to be less than 35%, especially less than 20%, the initial gram capacity, high-temperature cycling performance and high-temperature storage performance of the battery can be improved.

It can be seen from the results of Examples 6, 22, and 23 that, a lower ε enabled more doping element to be doped into the interior of particles in the positive electrode active material, fully playing the effect of doping element on enhancing the structural stability of the positive electrode material, thereby improving the thermal stability of the positive electrode material, and improving the capacity and high-temperature cycling performance of the battery. When ε was too high, more doping element was distributed in the gaps among the particles in the positive electrode active material or on surfaces of particles in the positive electrode active material, the effect of the doping element on improving the positive electrode active material was poor, and the thermal stability of the positive electrode active material was poor; but doping element distributed on the surface provided coating to some extent, which could isolate the electrolyte and reduce side reactions, and therefore the capacity and high-temperature cycling performance of the battery cell were slightly reduced in this case.

It can be seen from the results in Examples 1, and 10 to 18 that, by making the concentrations of element $M^1$, element $M^2$, and element $M^3$ each to be within an appropriate range, the initial gram capacity, high-temperature cycling performance and high-temperature storage performance of the battery could be improved.

It can be seen from the results in Examples 3, and 24 to 26 that, by making the exterior doped layer and the coating layer each have a thickness within an appropriate range, the battery could have relatively high gram capacity, and the high-temperature cycling performance and high-temperature storage performance of the battery can be improved.

The foregoing descriptions are merely specific embodiments of this application, but are not intended to limit the protection scope of this application. Any equivalent modifications or replacements readily figured out by a person skilled in the art within the technical scope disclosed in this application shall fall within the claimed scope of this application. Therefore, the protection scope of this application shall be subject to the protection scope of the claims.

What is claimed is:

1. A positive electrode active material, comprising bulk particles and an element $M^1$-containing oxide coating layer applied on an exterior surface of each of the bulk particles, wherein the bulk particles comprise a nickel-containing lithium composite oxide;

bulk phases of the bulk particles are uniformly doped with element $M^2$; and a surface layer of the bulk particles is an exterior doped layer doped with element $M^3$, wherein element $M^1$ and element $M^3$ are selected from one or more of Mg, Al, Ca, Ce, Ti, Zr, Zn, Y, and; and element $M^2$ comprises one or more of Si, Mo, V, Ge, Se, Nb, Rh, Pd, Te, and W;

wherein the nickel-containing lithium composite oxide is a compound represented by formula 1, $$Li_{1+a}[Ni_xCo_yMn_zM^2_bM^3_d]O_{2-p}X_p \quad \text{formula 1}$$

in the formula 1, X is selected from one or more of F, N, P, and S, $0.5 \le x < 1$, $0 < y < 0.3$, $0 < z < 0.3$, $-0.2 < a < 0.2$, $0 < b < 0.2$, $0 < d < 0.2$, $0 \le p < 0.2$, $x+y+z+b+d=1$.

2. The positive electrode active material according to claim 1, wherein when the positive electrode active material is in a 78% delithiated state, element $M^2$ has a valence higher than +3; or when the positive electrode active material is in a 78% delithiated state, element $M^2$ has more than two different valence states, and element $M^2$ in the highest valence state has one or more valences of +4, +5, +6, +7, and +8.

3. The positive electrode active material according to claim 1, wherein a relative deviation σ of local mass concentration of element $M^2$ in the bulk particles is less than 35%;

wherein the relative deviation σ is measured as following:

the relative deviation σ of local mass concentration of element $M^2$ in the bulk particles is calculated according to the following equation (1):

$$\sigma = \frac{\max\{|\eta_1 - \overline{\eta}|, |\eta_2 - \overline{\eta}|, |\eta_3 - \overline{\eta}|, \ldots, |\eta_n - \overline{\eta}|\}}{\overline{\eta}} \quad (1)$$

wherein an average mass concentration of element $M^2$ in the bulk particles is denoted as $\overline{\eta}$ in g/g; the mass concentration of element $M^2$ in μg/g at different sites in the bulk particles are respectively denoted as $\eta_1$, $\eta_2$, $\eta_3$, . . . , $\eta_n$, where n is a positive integer greater than or equal to 15.

4. The positive electrode active material according to claim 1, wherein a deviation ε of the concentration of element $M^2$ in the positive electrode active material with respect to an average mass concentration $\overline{\eta}$ in g/g of element $M^2$ in the bulk particles satisfies ε<50%;

wherein the deviation ε is calculated by equation (2):

$$\varepsilon = \frac{|\omega - \overline{\eta}|}{\omega} \quad (2)$$

where ω is global mass concentration of element $M^2$ in ppm in the positive electrode active material.

5. The positive electrode active material according to claim 1, wherein in the positive electrode active material, a concentration of element $M^1$ ranges from 100 ppm to 2000 ppm;

a concentration of element $M^2$ ranges from 500 ppm to 5000 ppm; and a concentration of element $M^3$ ranges from 400 ppm to 3000 ppm.

6. The positive electrode active material according to claim 1, wherein element $M^3$ in the bulk particle has a mass concentration gradient decreasing from the exterior surface to the core of the bulk particle; and a mass concentration of element $M^3$ in the exterior doped layer is less than a mass concentration of element $M^1$ in the coating layer.

7. The positive electrode active material according to claim 1, wherein element $M^1$ and element $M^3$ are both element L, wherein element L has a mass concentration gradient decreasing from the exterior surface to the core of the particle of the positive electrode active material, and element L is one or more of Mg, Al, Ca, Ce, Ti, Zr, Zn, Y, and B.

8. The positive electrode active material according to claim 1, wherein a ratio of a sum of the concentration of element $M^1$ and the concentration of element $M^3$ in the positive electrode active material to a volume average particle size $D_v50$ of the positive electrode active material ranges from 25 ppm/m to 1000 ppm/m.

9. The positive electrode active material according to claim 1, wherein a thickness of the exterior doped layer is 10% to 30% of the bulk particle size; or a thickness of the coating layer ranges from 1 nm to 200 nm.

10. The positive electrode active material according to claim 1, wherein the positive electrode active material further satisfies one or more of the following requirements (1) to (3):

(1) a volume average particle size $D_v50$ of the positive electrode active material ranges from 3 μm to 20 μm;

(2) a specific surface area of the positive electrode active material is 0.2 $m^2/g$ to 1.5 $m^2/g$; or (3) a tap density of the positive electrode active material ranges from 2.3 $g/cm^3$ to 2.8 $g/cm^3$.

11. A positive electrode plate, comprising a positive electrode current collector and a positive electrode active substance layer disposed on the positive electrode current collector, wherein the positive electrode active substance layer comprises the positive electrode active material according to claim 1.

* * * * *